US007612914B2

(12) United States Patent
Ito et al.

(10) Patent No.: US 7,612,914 B2
(45) Date of Patent: Nov. 3, 2009

(54) PRODUCTION OF COLOR SPACE CONVERSION PROFILE BASED ON CORRESPONDENCE OF GRID POINTS AND INK AMOUNTS

(75) Inventors: Takashi Ito, Nagano-ken (JP); Yoshifumi Arai, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 619 days.

(21) Appl. No.: 11/498,462

(22) Filed: Aug. 2, 2006

(65) Prior Publication Data

US 2007/0030505 A1 Feb. 8, 2007

(30) Foreign Application Priority Data

Aug. 3, 2005 (JP) ............................. 2005-225539

(51) Int. Cl.
*H04N 1/60* (2006.01)
(52) U.S. Cl. .................. 358/1.9; 358/502; 358/523; 358/525
(58) Field of Classification Search .................. 358/1.9, 358/3.23, 502, 518, 523, 525
See application file for complete search history.

(56) References Cited

U.S. PATENT DOCUMENTS

| 6,072,464 | A | * | 6/2000 | Ozeki | ........................ | 345/603 |
| 7,102,785 | B2 | * | 9/2006 | Tamagawa | .................. | 358/1.9 |
| 7,369,272 | B2 | * | 5/2008 | Ito et al. | ...................... | 358/1.9 |
| 7,450,267 | B2 | * | 11/2008 | Ito et al. | ...................... | 358/1.9 |
| 7,471,415 | B2 | * | 12/2008 | Ito et al. | ...................... | 358/1.9 |
| 2005/0094169 | A1 | * | 5/2005 | Berns et al. | .................. | 358/1.9 |
| 2005/0094871 | A1 | * | 5/2005 | Berns et al. | .................. | 358/1.9 |

FOREIGN PATENT DOCUMENTS

JP 2004-320624 11/2004

OTHER PUBLICATIONS

Abstract of Japanese Patent Publication No. 2004-320624, Pub. Date: Nov. 11, 2004, Patent Abstracts of Japan.

* cited by examiner

*Primary Examiner*—Scott A Rogers
(74) *Attorney, Agent, or Firm*—Martine Penilla & Gencarella, LLP

(57) ABSTRACT

A method for producing a profile specifying the correspondence relationship of values in different color spaces, includes a step of acquiring a first correspondence relationship that is a correspondence relationship of a plurality of ink amounts and color values, a step of acquiring a plurality of grid points that are a plurality of grid points in a predetermined color space and for which a relative relationship between the adjacent grid points is defined, a step of acquiring a second correspondence relationship that is a correspondence relationship of the plurality of grid points and color values, a step of acquiring a third correspondence relationship that is a correspondence relationship of the plurality of grid points and ink amounts based on the first correspondence relationship and the second correspondence relationship, and a step of producing a profile specifying the third correspondence relationship.

9 Claims, 17 Drawing Sheets

(A) SPECTRAL NEUGEBAUER MODEL $$R(\lambda) = a_w R_w(\lambda) + a_c R_c(\lambda) + \cdots + a_k R_k(\lambda)$$

$$a_w = (1 - f_c)(1 - f_m)(1 - f_y)$$
$$a_c = f_c(1 - f_m)(1 - f_y)$$
$$a_m = (1 - f_c)f_m(1 - f_y)$$
$$a_y = (1 - f_c)(1 - f_m)f_y$$
$$a_r = (1 - f_c)f_m f_y$$
$$a_g = f_c(1 - f_m)f_y$$
$$a_b = f_c f_m(1 - f_y)$$
$$a_k = f_c f_m f_y$$

(B) MURRAY-DAVIES MODEL $$f_c = f_{1D-LUT}(d_c)$$

(A) CELL DIVISION YULE-NIELSEN SPECTRAL NEUGEBAUER MODEL (B) INK COVERAGE RATIO (C) COMPUTATION OF SPECTRAL REFLECTANCE $Rsmp(\lambda)$ $$Rsmp(\lambda) = \left(\sum a_i R_i(\lambda)^{1/n}\right)^n$$

$$= \left(a_{11}R_{11}(\lambda)^{1/n} + a_{12}R_{12}(\lambda)^{1/n} + a_{21}R_{21}(\lambda)^{1/n} + a_{22}R_{22}(\lambda)^{1/n}\right)^n$$

$$a_{11} = (1 - f_c)(1 - f_m)$$
$$a_{12} = (1 - f_c) f_m$$
$$a_{21} = f_c (1 - f_m)$$
$$a_{22} = f_c f_m$$

$$R(\lambda)=\{a_wR_w(\lambda)^{1/n}+a_cR_c(\lambda)^{1/n}+a_mR_m(\lambda)^{1/n}+a_bR_b(\lambda)^{1/n}\}^n$$

$$a_w = (1-f_c)(1-f_m)$$
$$a_c = f_c(1-f_m)$$
$$a_m = (1-f_c)f_m$$
$$a_b = f_cf_m$$

PRODUCTION OF COLOR SPACE CONVERSION PROFILE BASED ON CORRESPONDENCE OF GRID POINTS AND INK AMOUNTS

The entire disclosure of Japanese Patent Application No. 2005-225539, file Aug. 3, 2005, is expressly incorporated by reference herein.

BACKGROUND

1. Technical Field

The present invention relates to a technique for producing a profile to be used for reference when converting a color system.

2. Related Art

Imaging devices such as displays or printers usually use color image data in which the colors of each pixel are tone represented by specific color components. For example, the image data specify colors via a variety of color spaces such as a RGB color space that uses three colors of R (red), G (green), and B (Blue) and a CMY-system color space using colors of C (cyan), M (magenta), and Y (yellow) system (including lc: light cyan, lm: light magenta, DY: dark yellow, and K: black). Because these colors are generally device-dependent colors that are inherent to individual imaging device, a color correction LUT (lookup table) specifying the correspondence relationship between colors in various device has been used to enable the output of the same image with the same colors in imaging devices of various types.

Regulating the correspondence relationship for all the colors that can be outputted in each imaging device in the color correction LUT is unrealistic due to limitations of storage capacity and work required to create the color correction LUT. For this reason, a correspondence relationship is usually regulated for a specific number of representative colors and the correspondence relationship for any other color is calculated by interpolation computations. Thus, a color correction LUT for a specific number of representative colors has been regulated by outputting colors from an imaging device and measuring the colors to an extent of actually possible colorimetry, without conducting colorimetry on a very large number of colors.

The specific number of colors that are the objects of colorimetry have to be determined before the color correction LUT is produced. The objects of colorimetry have been conventionally determined by a technique called color separation. The color separation technique involves specifying cubic grid points in the CMY space and converting the three colors of CMY in each grid point into six colors of CMYKl-clm according to a specific conversion rule, thereby determining grid points with components of ink colors (for example, JP-A-2004-320624).

The above-described conventional method requires a very large time and significant skills to produce a color correction LUT, and the color correction LUT is very difficult to create.

Thus, with the above-described color separation a large number of ink combinations have to be determined, while taking into account a variety of factors such as UCR and grain feel reduction and the necessity to meet the ink consumption limitations. For this reason, in order to perform color separation, it was necessary to rely on knowledge and experience of a specialist and to employ a trial and error method, and the procedure required a very long time.

SUMMARY

In accordance with one aspect of the present invention, corresponding information is created instead of color separation by associating a plurality of ink amounts with a plurality of grid points and then a profile is produced by conducting smoothing of the grid points. Thus, an association serving as a start for smoothing (a profile specifying the relationship based on this association is also called an initial LUT) is determined prior to performing the smoothing. When this association is performed, a plurality of ink amounts with a plurality of grid points are merely associated based on color values and no color separation is performed. Therefore, an initial LUT can be created in a very easy manner.

No specific limitation is placed on a method for selecting the aforementioned plurality of grid points. A relative relationship in a color space is defined for the adjacent grid points of those grid points. On the other hand, absolutely no limitation is placed on a method for selecting the aforementioned plurality of ink amounts. Moreover, no relative relationship between the ink amounts of those ink amounts is defined. Therefore, when the ink amounts are assumed to be plotted in an ink amount color space with each ink color as a component, no information whatsoever can be obtained with respect to the adjacency relationship between the grid points that have been plotted.

Accordingly, with one aspect of the invention, color values relating to the case where an output is made by ink amounts are acquired for a plurality of ink amounts, color values to be associated with the aforementioned plurality of grid points are then acquired, and the plurality of grid points and ink amounts are associated via the color values. As a result, an initial LUT in which a plurality of grid points and ink amounts are associated can be produced and the correspondence relationship of grid points and ink amounts in the predetermined color space can be acquired without color separation. Here, by implementing the smoothing based on the initial LUT, an arbitrary grid point present in the predetermined color space (a combination of arbitrary color component values) can be converted into an ink amount with high accuracy.

When the plurality of grid points and ink amounts are associated via color values, one ink amount (a data set for which color component values were defined for all the inks) may be associated with one grid point (a data set for which color component values in the predetermined color space were defined).

Here, it is not necessary to define the above-mentioned adjacency relationship for a plurality of ink amounts, and they can be selected by any method whatsoever. Thus, a plurality of ink amounts may be determined so that they can be referred to when associating the ink amounts (information for which color component values for each ink color are defined) with each of a plurality of grid points.

For example, a feature can be employed by which random numbers are generated and a color component value for each ink color is determined by a random number. In terms of associating with a plurality of grid points, it is preferred that the defined number of ink amounts be equal to or larger than the number of grid points. Furthermore, the relationship between the ink amount and color value may be found by colorimetry or by simulation, and a variety of methods can be employed therefore.

As for the plurality of grid points, a plurality of combinations of color component values forming the predetermined color space may be generated and the grid points may be taken in this predetermined color space. Furthermore, no specific limitation is placed on the predetermined color space and the number of dimensions thereof is not limited. For the sake of simplicity, a three-dimensional color space such as RGB or CMY can be used. The relative relationship of the adjacent grid points is defined in advance for those grid points (it may be said that a state is assumed that can specify which grid points are adjacent to a certain grid point). Thus, each grid point is uniquely specified by an identifier or the like, and when grid points are plotted in the aforementioned color space, an arrangement thereof can be specified and which grid point is adjacent and which grid point is not adjacent to a certain grid point can be defined.

The identifier specifying a grid point may be a simple number or a component value of the color space, and such identifier can identify a grid point by a variety of features. Thus, a color space is usually defined by three or more color components and a grid point is formed by randomly combining values of each color component. Here, if the color component values of a grid point are defined, then the position of the grid point in the color space is specified. Therefore, it is possible to clarify which grid points are adjacent and which are not adjacent to a certain grid point. It goes without saying that a definition is possible by which the arrangement mode of the grid points is determined and each grid point is provided with an identifier. For example, a configuration may be used in which an orthogonal grid is assumed for an orthogonal three-dimensional space and numbers are provided in a predetermined sequence to each grid point.

As described hereinabove, because ink amounts are associated via color values with a plurality of grid points for which an adjacency relationship has been defined, even if the adjacency relationship of the ink amount grid points formed by the ink amounts in the ink amount color space is not clear, the initial LUT can be created so that the adjacency relationship in a plurality of grid points and the adjacency relationship of the ink amount grid points are consistent. For this reason the aforementioned plurality of grid points and plurality of ink amounts can be selected by independent methods without any relationship to each other.

The consistent adjacent relationships are important in smoothing processing. Thus, because smoothing is implemented, as described hereinbelow, by adjusting the relative relationship of a certain grid point and grid points adjacent thereto, if the adjacent relationships are not consistent (while a certain color component has to increase in one arrangement of grid points, this color component decreases in another arrangement of grid points), the smoothing is difficult to implement. However, in accordance with one aspect of the invention, because the initial LUT can be defined without causing the discrepancy between adjacent relationships, a profile enabling highly accurate color conversion can be created by conducting smoothing with reference to the initial LUT.

When color values corresponding to a plurality of grid points are acquired, strict color matching is not required. Thus, it is not necessary to conduct color matching in the profile itself, provided that a profile can be produced that is suitable for highly accurate color conversion (conversion that is not accompanied by steep color changes). Furthermore, the predetermined color space defining the aforementioned plurality of grid points is not necessarily required to a color space formed by color components corresponding to colors used in an image device. For example, when the number of inks is six, the prescribed color space can be obtained by defining a smaller number of colors, that is, three virtual colors (for example RGB (also called "printer RGB") or CMY). Here, it is suffice if the color values can be calculated for specifying the correspondence relationship between the grid points and ink amounts so as to cause no discrepancy between the adjacent relationships.

For example, when the predetermined color space is a three-dimensional space, each color component may be set to correspond to an RGB component of a sRGB standard and may be converted to a color value by well-known equations. Furthermore, ink amounts for outputting colors approximating the colors indicated by the aforementioned plurality of grid points may be also postulated. Where the ink amounts are postulated, the color values can be easily acquired by colorimetry or simulation. A configuration involving simulation is preferred from the standpoint of automation. In addition, a variety of configurations can be employed, for example, only some of a plurality of grid points may be extracted to specify the ink amounts, and for other grid points, the postulated ink amounts may be calculated by interpolation.

For example, in the case where the predetermined color space is a three-dimensional space, when colors corresponding to apices of the color gamut are considered as colors approximating the colors indicated by a plurality of grid points, the ink amounts for outputting the approximation colors can be extracted in a comparatively simple manner. For example, a configuration can be employed in which if only the R component assumes a maximum values and the G component and B component are zero, then the M component and Y component in the CMYKlclm ink assume maximum values and other components are zero.

Where ink amounts are postulated for a plurality of grid points and color values are acquired, the ink amounts that have to be made to correspond to a plurality of grid points may be determined by referring to the correspondence relationships of the aforementioned plurality of ink amounts and color values (this relationship is termed the first correspondence relationship). For example, the correspondence relationship can be determined by using interpolation calculations or the like. Here, because the processing of determining the ink amount of each grid point is conducted based on the first correspondence relationship that was acquired in advance, the postulated ink amount is updated based on the first correspondence relationship. Various computation methods, e.g., interpolation computation using the difference in color values as a weighting factor, can be employed for the interpolation.

Other methods can be also employed for establishing the correspondence between a plurality of grid points and ink amounts. For example, the ink amounts corresponding to the plurality of grid points may be determined based on random numbers and an initial LUT that associates the plurality of grid points with ink amounts may be generated by correcting the random ink amounts based on the aforementioned first correspondence relationship. In this case, the random ink amounts determined based on random numbers are not related to the ink amounts in the first correspondence relationship, but if the color values are acquired by colorimetry or simulation from the random ink amounts determined based on random numbers, then the relationship with the ink amounts in the first correspondence relationship can be established via the color values and the ink amount of each grid point can be corrected.

In such correction, a certain grid point of a plurality of grid points is taken as an attention grid point, and an ink amount of a color value that is the closest to the color value corresponding to the attention grid point is extracted from the first correspondence relationship. The correction then may be carried out so as to approach the extracted ink amount. It was established that the ink amount can be determined so as to avoid a discrepancy between the above-described adjacent relationships by multiple cycles of correction if processing of correcting the ink amount associated with the attention grid point and a plurality of grid points surrounding the attention grid point is repeated so as to reduce the difference between the ink amount associated with the attention grid point and a plurality of grid points surrounding the attention grid point and the extracted ink amount.

Where the initial LUT is thus created by associating a plurality of grid points with ink amounts, the arrangement of grid points of color values associated with the ink amounts recorded in the initial LUT is smoothed in a device-independent color space. Here, smoothing of the grid point arrangement is implemented by increasing the degree of smoothness of the grid point arrangement. Furthermore, the degree of smoothness of the grid point arrangement is the degree of distortions occurring when the grid points are arranged side by side in the space. For example, when the grid points are arranged in the form of a cubic grid in a device-independent color space, there are no distortions, but if the grid points are displaced from the positions of cubic grid points, the distortions increase. Furthermore, the degree of smoothness can be said to be high when the grid points are uniformly arranged in the device-independent color space, and when a curve is considered which is drawn from one boundary of a color gamut formed in the device-independent color space to another boundary and connects the adjacent grid points in the device-independent color space, the degree of smoothness can be said to be low if this curve is described by a high-order function.

With the method by which the grid points are orderly arranged in each color space, when the colors positioned therebetween are calculated by interpolation, the interpolation can generally be conducted without the interpolation accuracy being changed significantly by the local position of the space. Therefore, producing a profile by smoothing the grid point arrangement enables the interpolation computation suppressing steep color changes.

A variety of methods can be employed for smoothing. For example, a configuration can be employed by which an evaluation function for evaluating the degree of smoothness of the grid point arrangement is introduced and the evaluation conducted with the evaluation function is converged to optimum evaluation by repeating the processing of updating the ink amount. Furthermore, another possible option is to introduce virtual forces acting upon the grid points, conduct a simulation by which the grid points are moved by the action of the virtual forces, and smooth the grid point arrangement by stabilizing to a stationary state. When the grid point arrangement is smoothed, a method is preferably employed by which the grid point arrangement is converged to a most smoothed state by repeating fine corrections, and a variety of optimization methods can be employed therefor. For example, various algorithms such as a quasi-Newton method and a conjugate gradient method, can be employed.

It goes without saying that various restricting conditions can be introduced in the above-described smoothing. For example, restricting conditions can be set so that no data are generated outside the color gamut or so that inks are not used in an amount exceeding a limitation placed thereon. The aforementioned color values are the information for specifying the colors and are color component values in the device-independent color space. No specific limitation is placed on the color space and, for example, a Lab color space (usually, represented by assigning the grid point symbol as in L*a*b*, but in the present specification, the symbol * will be omitted for simplicity) or XYZ color space.

If a profile is produced in the above-described manner, this profile can be used for implementing accurate color conversion. For example, color values of the colors printed with the ink amounts specified by the profile can be acquired by colorimetry or simulation and those ink amounts can be associated with the colors used in other imaging devices (for example, a display). As a result, the color conversion can be implemented with a high accuracy with the created color correction LUT.

Furthermore, an apparatus for producing a profile or a program for producing a profile can be implemented by using the above-described method for producing a profile, and a printing control method, printing control apparatus, and printing control program using the color correction LUT can be implemented. Furthermore, the concept of the invention is not limited to the apparatus and method of one aspect of the present and includes a variety of modes in which the apparatus and method can be modified appropriately. For example, they can be implemented independently or can be implemented within another device and method upon incorporation in a certain device. It goes without saying, that the invention can be employed with a recording medium where software was recorded. The recording medium may be a magnetic recording medium or a magnetooptical recording medium and can be employed in absolutely the same manner with any recording medium that will be developed in the future.

The invention can be also used in one mode thereof when a communication line is used as a software supply method. The concept of the invention is not changed in any way when it is implemented partly in the form of software and partly in the form of hardware, and also a mode may be employed in which part thereof is stored on a recorded medium and read appropriately therefrom when necessary.

These and other features, aspects, and advantages of the invention will be apparent to those skilled in the art from the following detailed description of preferred non-limiting exemplary embodiments, taken together with the drawings and the claims that follow.

DESCRIPTION OF EXEMPLARY EMBODIMENTS

Figure 1:
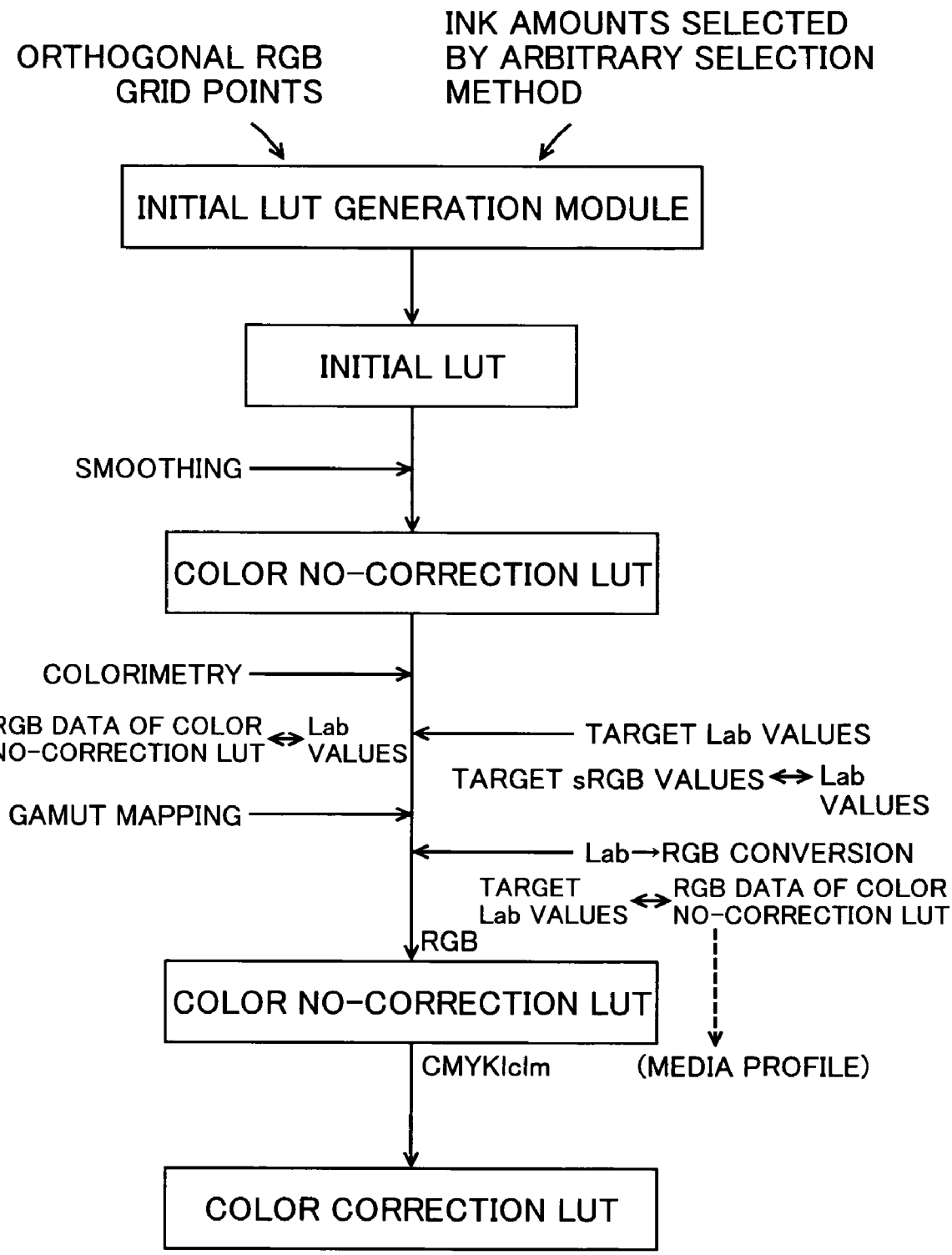
FIG. 1 is an explanatory drawing illustrating schematically a process of producing a color correction LUT.

The preferred embodiments of the invention will be described below according to the following order.
1 Summary on color correction LUT production and smoothing
2 Printing control device
3 Initial LUT creation processing
4 Smoothing processing
5 Optimization by evaluation function
5-1 Evaluation function $E_1$
5-2 Evaluation function $E_2$
5-3 Evaluation function $E_3$
6 Printing model
7 Other Embodiments

1 Summary on Color Correction LUT Production and Smoothing

Figure 2:
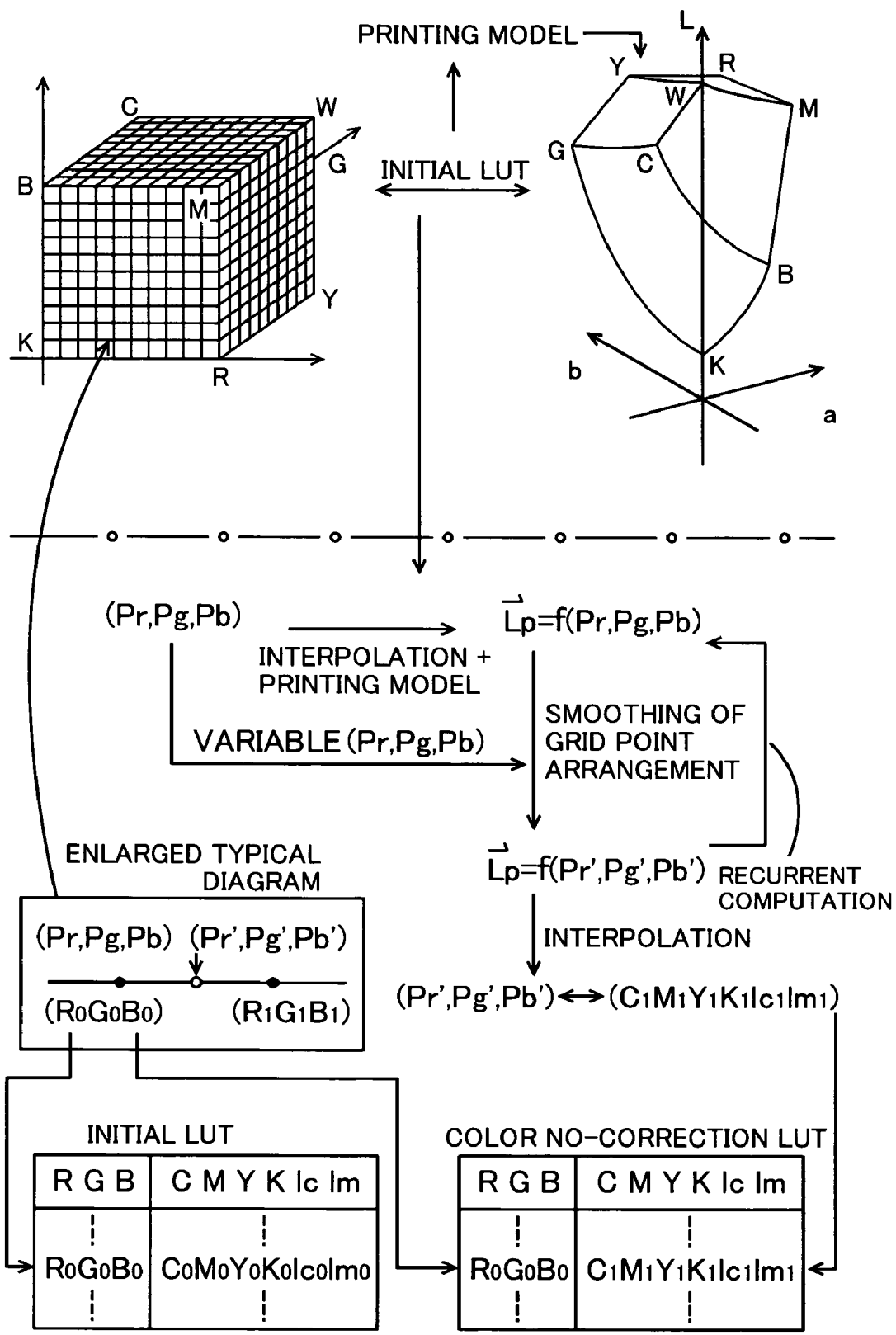
FIG. 2 is a schematic diagram illustrating the smoothing procedure.

FIG. 1 is an explanatory drawing for explaining schematically the production process of a color correction LUT that is referred to when printing is executed with a printer. FIG. 2 is an explanatory drawing for explaining schematically the smoothing implemented when this color correction LUT is produced. Because those processes require a large amount of computation processing, it is preferred that a computer be used. Furthermore, because printing is actually carried out, it is preferred that the printing be carried out with a printer using the produced color correction LUT, and even with the below-described halftone processing (HT) it is necessary that algorithm be used that is identical to the halftone processing used by the printer.

The color correction LUT in the present embodiment is a table in which a correspondence relationship of sRGB data and CMYKlclm data is defined for a plurality of reference points and makes it possible to associate the sRGB data and CMYKlclm data for any color by implementing the interpolation processing with reference to those reference points. In prior art, an operation called color separation was necessary to produce such color correction LUT, but in accordance with the invention, the production of color correction LUT can be completed without performing the color separation operation.

More specifically, the color separation operation is an operation of selecting a combination of tone values indicating the ink amounts for use in printing artificially or according to a predetermined rule. When a combination of tone values is selected for inks of four or more colors, a combination of tone values is usually selected in a three-dimensional space such as CMY (cyan, magenta, yellow) or RGB (red, green, blue), and the amount of inks of four or more colors is determined based on this combination. For example, an operation is carried out in which a fixed amount is removed by UCR (Under Color Removal) from a combination of tone values defined for each color of CMY, K (black) that carries out an output identical to the output of remove ink is added, and each color of C, Y is replaced with a combination of dense ink and light ink.

In addition, an operation is carried out in which a tone value is defined so as to obtain an ink usage amount at which no grainy pattern is seen, or a tone value is define so as to expand the color gamut as much as possible, or a tone value is selected so as to confine the ink within the ink amount limits. In prior art, this operation has been performed by a specialist on the ink-produced output based on the specialist's knowledge and experience, but because the ink usage state greatly affects the quality of printed product, the color separation operation has been considered necessary for conducting fine adjustment.

However, the execution of this operation takes a very long time because it is necessary to rely upon the knowledge and experience of a specialist and employ a trial and error approach. Furthermore, the number of combinations of tone values with a large number of inks is very large (for example, it is $256^6$ with inks of 6 colors and 256 tone numbers), and an ideal combination of tone values is very difficult to extract by the color separation operation from such large numbers. Accordingly, the invention of the present application employs a feature of producing a color correction LUT by selecting tone values indicating the ink amount by any procedure. As a result, no limitations are placed on the combinations of ink amount tone values prepared at the initial stage and a color correction LUT can be produced, for example, based on a combination of randomly selected ink amount tone value.

In FIG. 1, a LUT used instead of the color separation LUT produced by the conventional color separation operation is taken as an initial LUT, and in the present embodiment this initial LUT will be created by the below-described initial LUT creation module. This initial LUT creation module is a module specifying the correspondence relationship between a plurality of grid points selected without any relation to each other in different color spaces. In the present embodiment, this module associates RGB grid points with ink amount grid points.

More specifically, in the present embodiment, orthogonal RGB grid points (grid points formed by combination of values obtained by dividing the tone value regions of equal values of each axis into equal sections, with the color components of RGB being plotted against the orthogonal axes) are defined and associated with ink amount grid points (grid point in an ink amount space formed by axes with colors as color components (in the present embodiment CMYKlclm)) selected by a random selection method. Here, the initial LUT creation module defines the correspondence relationship so as to avoid the discrepancy between the adjacency relationship of the orthogonal RGB grid points and the adjacency relationship of the ink amounts associated with those orthogonal RGB grid points. For example, the two correspondence relationships are defined so that when an R component of one grid point increases with respect to that of the other grid point in mutually adjacent RGB grid points, the R component of the color outputted by the corresponding ink amount also increases.

In the present embodiment, the correspondence relationship with the ink amount grid points is defined with consideration for the adjacency relationship of orthogonal RGB grid points, but strict matching of the output colors is not required. Therefore, in the initial LUT, by contrast with the above-described color correction LUT, when the RGB data of reference points are taken as data to be used in an imaging device, this color and the color indicated by the CMYKlclm data do not necessarily match. Furthermore, in the present embodiment, a tone value region (mostly 0-255) for use in each imaging device is employed as a tone value region of RGB data and CMYKlclm data. Furthermore, because each color of RGB is in a complementary color relationship with each color of CMY, if the colors are not strictly regulated by the tone values, it is possible to take C=255−R, M=255−G, Y=255−B, and in this sense, the RGB data in the initial LUT may be CMY data.

Furthermore, an arbitrary ink amount can be converted into color values (Lab values and the like) by simulation based on the below-described printing model. Therefore, the correspondence relationship of the RGB grid points and ink amount grid points essentially can be considered as a correspondence relationship of the RGB points and color values. In accordance with the invention, this relationship is used, a smoothing processing is implemented in the Lab space with respect to the ink amount grid points in the initial LUT, and the color correction LUT is produced by specifying a strict correspondence relationship between colors indicated by respective RGB data and CMYKlclm data after smoothing processing.

The smoothing is a processing of smoothing the arrangement of grid points when the colors corresponding to ink amount grid points specified by the initial LUT (colors outputted at the ink amount tone values thereof) are taken as grid points in the Lab color space. Thus, because the above-described initial LUT merely associates the orthogonal RGB grid points with the ink amount grid points that were selected by a random procedure, the grid points in the Lab color space corresponding to the ink amount grid points have a low degree of smoothness of grid point arrangement. When a curve is considered which connects the adjacent grid points in the Lab color space and is drawn from one boundary of the color gamut formed in the Lab color space to the other boundary, a state with a low degree of smoothness of grid point arrangement is said to be a state in which the curve is described by a high-order function.

When a color correction LUT is produced, interpolation computation is used in the below-described manner. Furthermore, the interpolation computation is also used during color conversion referring to the color correction LUT. A variety of methods such as linear interpolation and spline interpolation can be used for interpolation computation, but with any such method a color of a grid point that is the object of interpolation is computed from the grid points present around the grid point that is the object of interpolation. Therefore, if the degree of smoothness of grid point arrangement is low (or when the above-described curve is a high-order function), the accuracy of interpolation computation decreases.

Where the accuracy of interpolation computation is low, the correspondence of CMYKlclm data (tone values of each color of CMYKlclm) and sRGB data (tone values of each color of RGB) defined in the color correction LUT, which is the final object of the production process, cannot be defined with high accuracy and the accuracy of color conversion during printing degrades. Furthermore, the degree of smoothness of grid point arrangement indicated by the CMYKlclm data specified in the initial LUT is nor uniform as a whole and differs depending on the position of the Lab color space, the interpolation accuracy can also differ in the color space, and color conversion accuracy can differ locally. Where printing is executed in such a state, in particular, when an image with continuous color variations, such as gradation, is printed, the color does not change smoothly and high-quality printing cannot be executed.

Thus, in accordance with the invention, the grid point arrangement is smoothed by smoothing processing. The above-described initial LUT defines the correspondence relationship between orthogonal RGB grid points and ink amount grid points, and the orthogonal RGB grid points form cubic grid points such as shown in the upper left section of FIG. 2 in a RGB color space of an orthogonal three-dimensional space. The arrangement of such cubic grid points can be said to have a high degree of smoothness and contain no distortions.

On the other hand, the color gamut indicating the range of colors outputted by each color ink of CMYKlclm has distortions in the Lab color space. Thus, the color gamut in the Lab color space is shown in the upper right section of FIG. 2. As shown in FIG. 2, the color gamut in the Lab color space has a distorted shape. Furthermore, in the above-described initial LUT, the degree of smoothness of the mutually adjacent grid points is not taken into account. Therefore, if the colors indicated by the ink amount grid points are disposed in the Lab color space, the grid points are arranged so that the grid points are present in a disordered fashion in the distorted color gamut. Thus, the degree of smoothness of grid point arrangement is low.

Accordingly, in the smoothing processing of the present embodiment, the grid point arrangement of colors indicated by the CMYKlclm data defined in the initial LUT is smoothed in the Lab color space and a LUT with a high smoothness degree of grid point arrangement is produced (in the present specification, this LUT will be referred to as a color no-correction LUT. This color no-correction LUT is equivalent to the profile referred to in the claims hereinbelow). The section below the center in FIG. 2 shows a summary of the processing conducted when a color correction LUT is produced from the initial LUT. In the present embodiment, position information (Pr, Pg, Pb) designating the orthogonal RGB grid point position of the initial LUT is taken as a variable, a grid point in the Lab color space is represented by a vector $L_p$=f(Pr, Pg, Pb), and the position information (Pr, Pg, Pb) is sequentially updated.

Thus, the grid point position indicated by the vector $L_p$ before the grid point position of the adjustment object becomes smooth in relation to the surrounding grid point positions is adjusted by recurrent computations successively updating the position information (Pr, Pg, Pb). As a result, the arrangement of grid points in the Lab color space is smoothed. Further, the position information of the present embodiment satisfies the conditions: $0 \leq Pr \leq$(number of grid points in the R direction minus 1), $0 \leq Pg \leq$(number of grid points in the G direction minus 1), $0 \leq Pb \leq$(number of grid points in the B direction minus 1), but this position information may be RGB data, provided that the position of grid points can be designated.

However, as described hereinbelow, because the RGB data specified in the color correction LUT and the RGB data specified in the initial LUT (tone values in the orthogonal RGB grid points) have the same values, even when the RGB data are used as the position information, it does not mean that the position information is used to update the values of the RGB data specified in the initial LUT, but it means that the position information is used to update the CMYKlclm data. Furthermore, the aforementioned function f describes the computation performed when the amount of ink is acquired by conducting interpolation based on the position information with reference to the initial LUT, and the Lab values are obtained with a printing model based on this amount of ink.

If the position information (P'r, P'g, P'b) can be determined so as to obtain grid points with a high smoothness degree of arrangement in the Lab color space, then the aforementioned color no-correction LUT can be produced by computing the amount of ink corresponding to the position information (P'r, P'g, P'b) by using the initial LUT. The relationship between the position information and RGB data before and after smoothing is shown schematically on an enlarged view in FIG. 2. In this figure, black circles on a straight line indicate the grid points in the RGB color space. The RGB data in each grid point are $R_0, G_0, B_0$ and $R_1, G_1, B_1$, respectively.

When the grid point in which the RGB data are $R_0, G_0, B_0$ is the smoothing object, the position information thereof is (Pr, Pg, Pb), and the position information (P'r, P'g, P'b) indicating the position of grid points corresponding to white circles after smoothing is to be obtained. At this time, in the grid points located around the grid point represented by white circle and specified by the position information, the CMYKlclm data have been associated by the above-described initial LUT. Therefore, if the interpolation computation is implemented by using these data, the data $C_1 M_1 Y_1 K_1 lc_1 lm_1$ corresponding to the grid point represented by the white circle can be calculated.

Accordingly, the color no-correction LUT is obtained by associating the CMYKlclm data ($C_1 M_1 Y_1 K_1 lc_1 lm_1$) with the RGB data ($R_0, G_0, B_0$) relating to the grid point which is the smoothing object. The arrangement of grid points corresponding to the colors specified in the color no-correction LUT has a high degree of smoothness in the Lab color space. Therefore, the interpolation computation can be executed with a high accuracy by referring to the colors specified in the color no-correction LUT.

In the color no-correction LUT that was thus produced, the output colors do not necessarily match. Thus, the colors obtained when the RGB data are taken as the color component values of image data (colors specified by sRGB) and the colors obtained when printing is executed with the corresponding CMYKlclm data do not necessarily match. Accordingly, a color correction LUT matching those colors has to be produced, but matching of colors is difficult to estimate if the color systems are different. Therefore, in the present embodiment the colors indicated by the sRGB data and the colors indicated by the CMYKlclm data are associated with each other in the Lab color space. The interpolation computation is implemented when the color system is converted, but because the color no-correction LUTs has been smoothed so as to enable the implementation of a highly accurate interpolation computation, a color correction LUT that enables highly accurate color conversion can be produced by such highly accurate interpolation computation.

In order to produce the color correction LUT, first, a color chart is acquired by printing a plurality of patches based on each RGB data specified in the color no-correction LUT. Because, the RGB data and CMYKlclm data has been associated with each other in the color no-correction LUT, this printing based on the RGB data is equivalent to printing based on the CMYKlclm data specified in the color no-correction LUT. If the color chart is obtained, then the Lab values of the patches printed with each RGB data specified in the color no-correction LUT can be acquired by successively measuring the colors of the patches on the chart with a calorimeter. On the other hand, the sRGB data serving as the reference points recorded in the color correction LUT are determined in advance (in the present embodiment, the sRGB data are called a target). Because the corresponding Lab values for the sRGB data can be acquired with well-known equations, the Lab values corresponding to the target can be easily acquired.

If it were possible to determine which values are assumed by the colors indicated by the sRGB data in the RGB color system specified in the color no-correction LUT, then the color correction LUT could be produced by associating the sRGB data with the CMYKlclm data by converting the RGB data into the CMYKlclm data with reference to the color no-correction LUT. Accordingly, the interpolation computation is implemented by referring to the Lab values of patches printed with each RGB data specified in the color no-correction LUT and the RGB values corresponding to the Lab values of colors indicated by they sRGB data are acquired.

The CMYKlclm data corresponding to the RGB data are then acquired by referring to the color no-correction LUT. Because the RGB data correspond to the Lab values of the colors indicated by the sRGB data, the colors indicated by the CMYKlclm data will match the colors indicated by the sRGB data. Therefore, a color correction LUT can be produced by producing a table in which the two are associated. In the present embodiment, gamut mapping is conducted before associating the Lab values of the target with the RGB values of the color no-correction LUT.

Thus, because the size of the color gamut of colors that can be represented by the sRGB data is different from the size of the color gamut of colors that can be represented by the RGB data specified in the color no-correction LUT, the color gamut compression is conducted so as to match the two. It goes without saying that corrections of various types other than gamut mapping may be conducted. For example, because the actual color differs from the color memorized by people (thus, people tend to memorize more clearly the color of the sky or body that actual colors), the color may be corrected so as to make it closer to the color memorized by people. In any case, a color correction LUT can be produced in which the sRGB data are associated with the CMYKlclm data from the data specified in the color no-correction LUT by considering the colors as Lab values via colorimetry and sRGB conversion equations.

2 Printing Control Device

Figure 3:
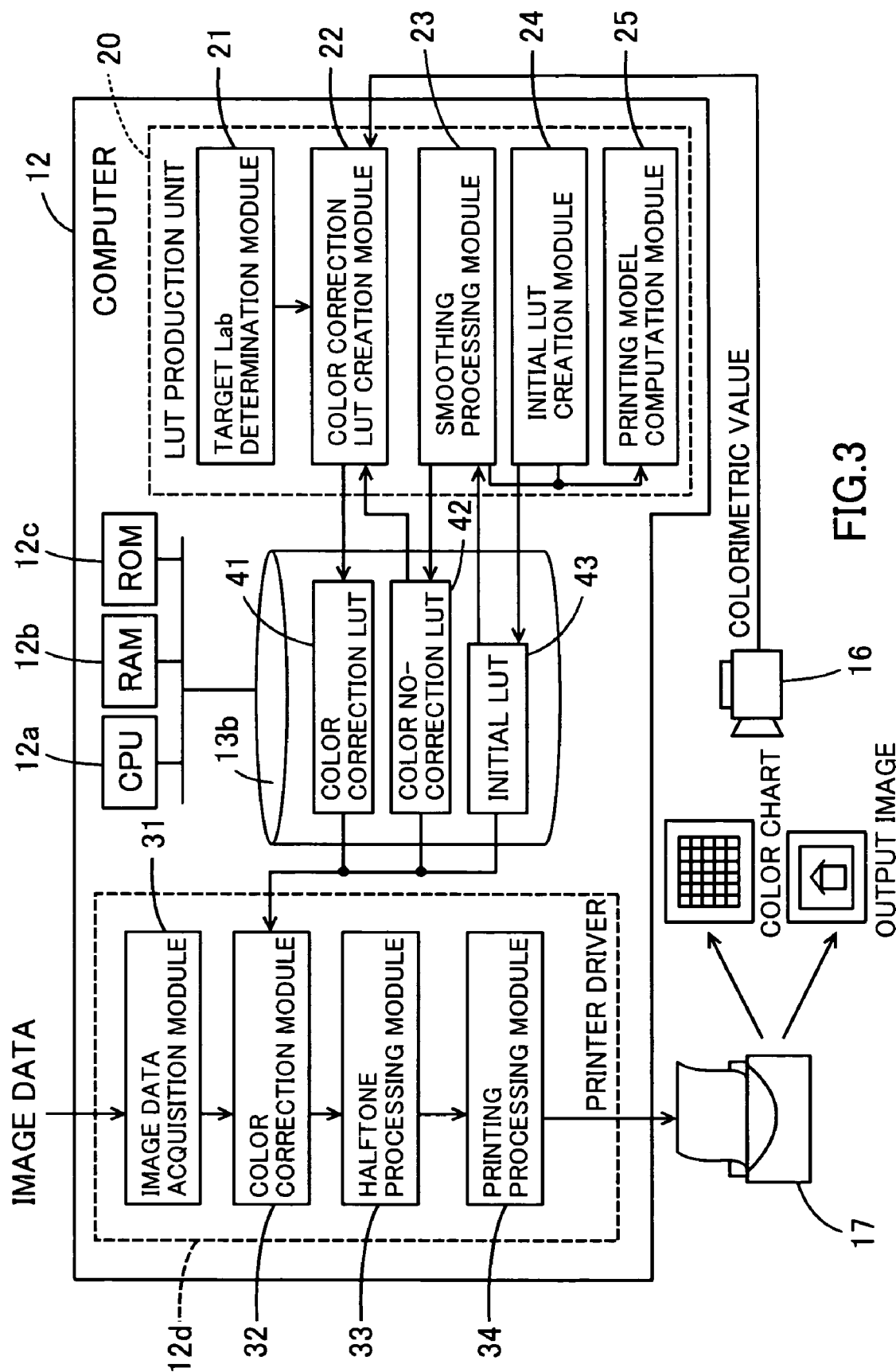
FIG. 3 is a block diagram showing a printing control device.

The configuration of a printing control device for performing printing by referring to the color correction LUT produced by using the smoothing processing in accordance with the invention will be described hereinbelow. FIG. 3 is a block diagram illustrating a program to be executed in a printing control device and hardware therefore. A computer 12 comprises a CPU 12a for performing the computation, and the CPU 12a controls the entire computer 12 via a system bus. A RAM 12b, a ROM 12c, a hard disk 13b and a USB I/F, a CRT I/F, and an input device I/F (not shown in the Figure) are connected to the same system bus.

The hard disk 13b stores an operating system (OS), a LUT production unit 20 for producing a color correction LUT, and a printer driver 12d for performing image printing as software, and software of those types are transferred appropriately into the RAM 12b by the CPU 12a during execution. The CPU 12a executes a variety of programs under OS control, while appropriately accessing the RAM 12b as a temporary work area.

A keyboard and mouse (not shown in the figure) are connected as input devices for operation to the input device I/F. Furthermore, a display is connected for displaying information to a CRT I/F. Therefore, in the computer 12, the operation contents created by the keyboard or mouse can be received and information of various types can be displayed on the display. Furthermore, a printer 17 is connected to the USB I/F and images can be printed based on the data outputted by the computer 12.

A calorimeter 16 is also connected to the USB I/F, and the computer 12 acquires the colorimetric values (color values) measured by the colorimeter 16. Thus, the calorimeter 16 illuminates the printout with a light source with known spectral reflectance, detects the spectral reflectance of the printout by detecting the reflected light, and outputs the color values to the computer 12. It goes without saying that the connection I/F with the printer 17 is not limited to the USB I/F and that a variety of connection modes such as a parallel I/F, a serial I/F, and a SCSI connection can be employed. The same is true for any connection modes that will be developed in the future.

The processing relating to the case where the computer 12 is caused to function as a printing control device in accordance with the invention will be described below. The computer 12 acquires image data used in a variety of imaging devices, e.g., image input devices such as scanners, digital still cameras, and video cameras, and image output devices such as displays and projectors and executes printing in the printer 17 by executing color conversion with reference to the color correction LUT.

In order to execute the printing using the color correction LUT, the computer 12 of the present embodiment comprises the above-described printer driver 12d for conducting data processing during printing and a LUT production unit 20 for producing the color correction LUT, as shown in FIG. 3. The printer driver 12d comprises an image data acquisition module 31, a color correction module 32, a halftone processing module 33, and a printing processing module 34. The image data acquisition module 31 is a module for acquiring the image data indicating the printing object image. When the number of pixels in the acquired image data does not conform to the number of pixels necessary for printing, the image data acquisition module 31 executes a resolution conversion to provide for the conformity of the two. The color correction module 32 is a module for converting the color system of the image data by interpolation computations. This module acquires the image data from the image data acquisition module 31 and converts the color system thereof.

Thus, this module calculates a combination of CMYKlclm color component values corresponding to a combination of arbitrary RGB color component values with reference to any of a color correction LUT 41 or a color no-correction LUT 42 that are stored on the hard disk 13b. When an image printing designation is performed with an application program (not shown in the figure), the color correction module 32 conducts color conversion with reference to the color correction LUT 41 and executes color conversion with high accuracy. At a state of producing the color correction LUT 41 in the LUT production unit 20, the color correction module 32 conducts color conversion by referring to the color no-correction LUT 42. Therefore, in the color correction module 32, the color conversion can be conducted by selecting an appropriate LUT according to the state and the printing can be conducted with the data after color conversion.

If the color correction module 32 creates the CMYKlclm data by conducting color conversion, those CMYKlclm data are transferred to the halftone processing module 33. The halftone processing module 33 is a module for conducting half tone processing by converting the CMYKlclm tone values of each dot and representing them by the recording density of ink droplets. This module creates head drive data for causing the ink to adhere at a recording density after conversion. The printing processing module 34 receives those head drive data and rearranges them into the order that can be used by the printer 17.

Thus, the printer 17 carries a row of discharge nozzles (not shown in the Figure) as ink discharge devices. In this nozzle row, a plurality of discharge nozzles are arranged side by side in the secondary scanning direction. Therefore, the data separated by several dots in the secondary scanning direction are used simultaneously. Accordingly, rasterizing is conducted so as to rearrange the order so that the data that have to be used simultaneously of the data arranged in the main scanning direction are simultaneously buffered in the printer 17. The printing processing module 34 creates the printing data by adding the predetermined information, such as image resolution, after such rasterizing and outputs the printing data to the printer 17. In the printer 17, the image indicated by the image data is printed based on the printing data.

In the present embodiment, the LUT production unit 20 is installed inside the computer 12 serving as a printing control device, and the LUT production unit 20 produces the color correction LUT 41 prior to printing. The LUT production unit 20 comprises a target Lab value determination module 21, a color correction LUT creation module 22, a smoothing processing module 23, an initial LUT creation module 24, and a printing model computation module 25. Furthermore, colorimetry of each patch on a color chart printed in the printer 17 can be conducted in the calorimeter 16 and the Lab values thereof can be supplied to the computer 12.

In order to produce the color correction LUT 41 with the LUT production unit 20, first, the initial LUT creation module 24 produces the initial LUT 43 and stores it in the hard disk 13b. The color no-correction LUT 42 is produced during the production of the color correction LUT 41 and stored in the hard disk 13b. Thus, the smoothing processing module 23 produces the color no-correction LUT 42 by conducting the below-described processing with reference to the initial LUT 43.

The target Lab value determination module 21 is a module for determining the sRGB data of the target and calculating the color values (Lab values) thereof with the predetermined computation equations. Furthermore, the color correction LUT creation module 22 is a module for conducting processing for creating the color correction LUT 41 from the color no-correction LUT 42 by the processing shown in FIG. 1. First, the color correction LUT creation module 22 produces an image data of patches in each RGB data specified in the color no-correction LUT 42 and outputs the image data to the color correction module 32.

At this time, the color correction module 32 acquires the CMYKlclm data corresponding to each RGB data by referring to the color no-correction LUT 42 and transfers the CMYKlclm data to the halftone processing module 33. The halftone processing module 33 and printing processing module 34 print the patches based on the CMYKlclm data. As a result, the color chart that was printed based on the RGB data specified in the color no-correction LUT 42 is printed. Colorimetry of the color chart is conducted by the colorimeter 16, and the Lab values thereof are inputted into the color correction LUT creation module 22.

Furthermore, the color correction LUT creation module 22 acquires the color values of the sRGB data determined by the target Lab value determination module 21. The RGB data corresponding to the sRGB values of the target (RGB data in the RGB color system used in the color no-correction LUT 42) by conducting a processing such as gamut mapping and also conducting the interpolation processing. Then, the obtained RGB data are converted with the color no-correction LUT 42 to acquire the corresponding CMYKlclm data, and the color correction LUT 41 is produced by associating those CMYKlclm data with the sRGB data. The produced color correction LUT 41 is stored in the hard disk 13b.

3 Initial LUT Creation Processing

Figure 4:
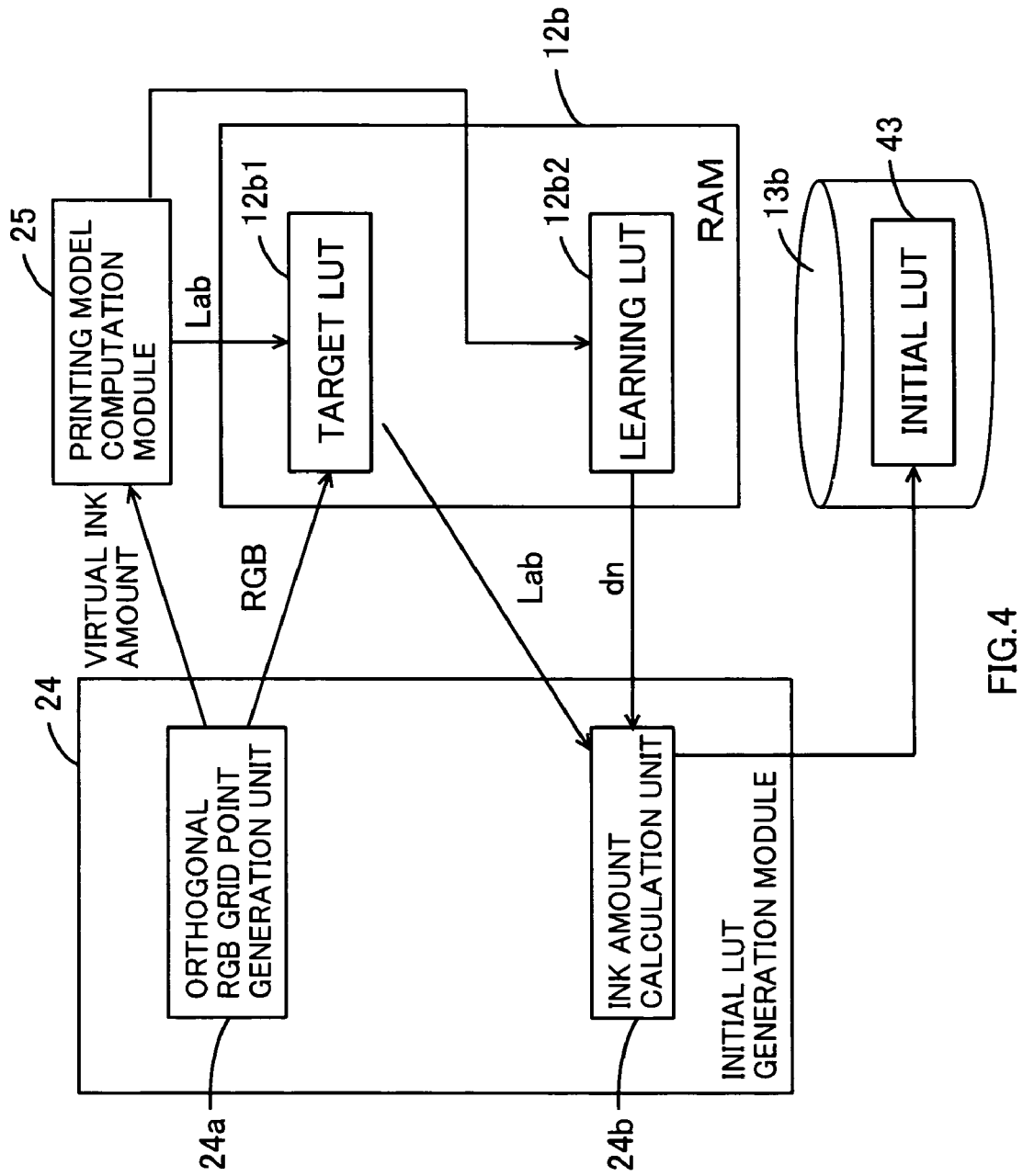
FIG. 4 is a block diagram illustrating the configuration of an initial LUT creation module.
Figure 5:
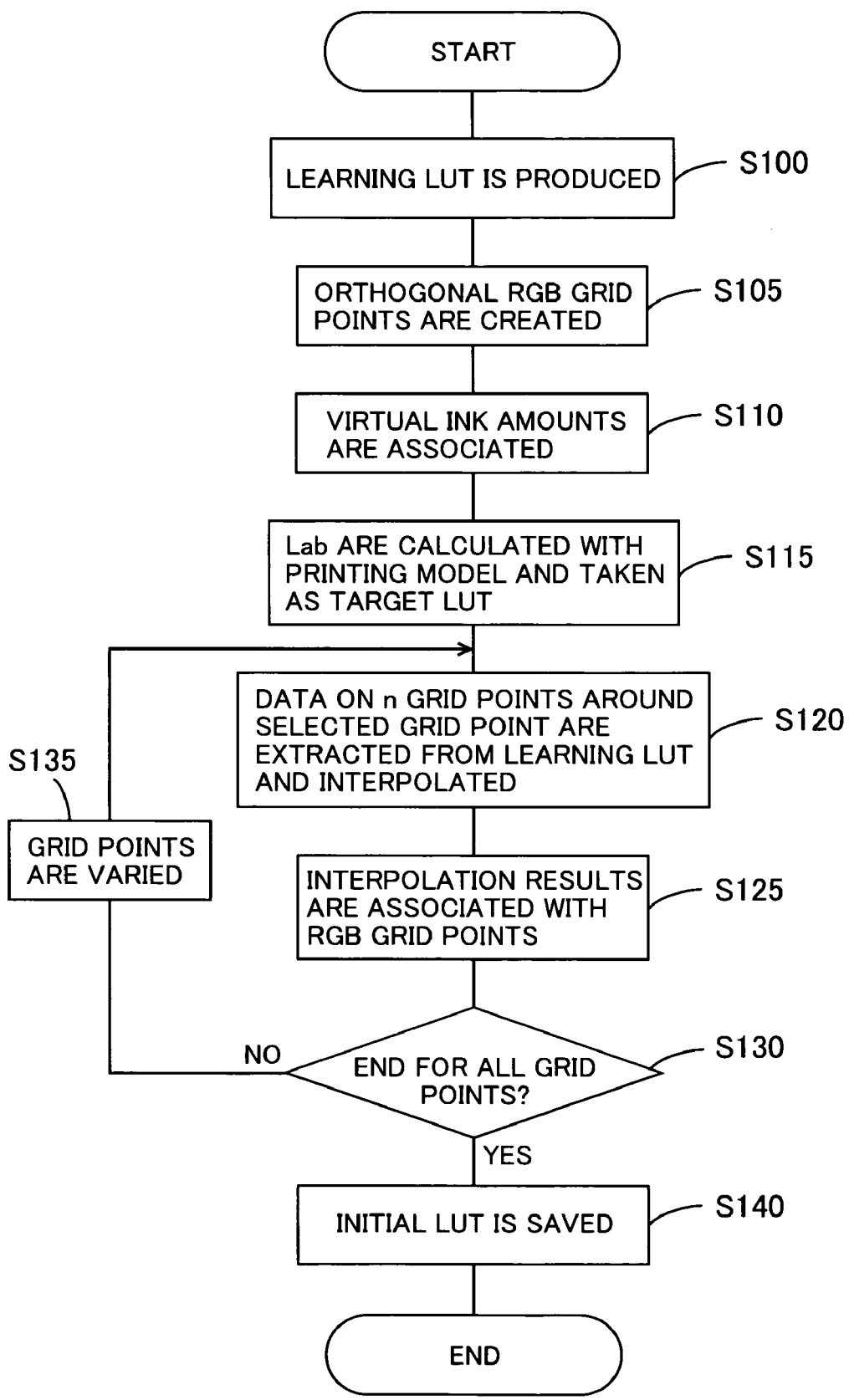
FIG. 5 is a flowchart illustrating the procedure executed in the initial LUT creation module.

The processing conducted to create the above-described initial LUT 43 will be described below in greater detail. FIG. 4 is a block diagram illustrating the configuration of the initial LUT creation module 24. FIG. 5 is a flowchart illustrating the processing executed in the initial LUT creation module 24. The initial LUT creation module 24 comprises an orthogonal RGB grid point creation unit 24a and an ink amount calculation unit 24b. In the present embodiment, the printing model computation module 25 produces a learning LUT 12b2 (step S100) and produces the initial LUT 43 by using the learning LUT 12b2. In the present embodiment, this step S100 is equivalent to the processing of "acquiring first correspondence relationship constituted by a plurality correspondence relationships of ink amounts and color values" or a processing in "the first correspondence relationship acquisition unit" in the claims.

The learning LUT 12b2 is a LUT in which the ink amount grid points are associated with Lab values, and the ink amount grid points specified in the learning LUT 12b2 are the ink amounts selected regardless of the orthogonal RGB grid points. In the present embodiment, random numbers are created and the tone values of each color of the ink amount grid points are determined based on the random numbers. Preferably, the number of ink amount grid points is larger than the number of the orthogonal RGB grid points. If the ink amount grid points are determined, then the amount of ink of each grid point is converted into the Lab value by the printing model computation module 25 and the two are associated with each other, thereby producing the learning LUT 12b2 which is temporarily stored in the RAM 12b.

In the orthogonal RGB grid point creation unit 24a, as shown in the upper left section of FIG. 2, the tone value region in each color component of the RGB is divided into equal sections and the orthogonal RGB grid points are created by combining the values obtained (step S105). Here, no specific limitation is placed on the number of sections into which the tone value region is divided, but about 10 sections are preferred. The tone value indicating the created orthogonal RGB grid point is taken as part of a target LUT 12b1 and temporarily stored in the RAM 12b. In the present embodiment, this step S105 is equivalent to the processing of "acquiring a plurality of grid points" or a processing in "the grid point acquisition unit".

Figure 6:
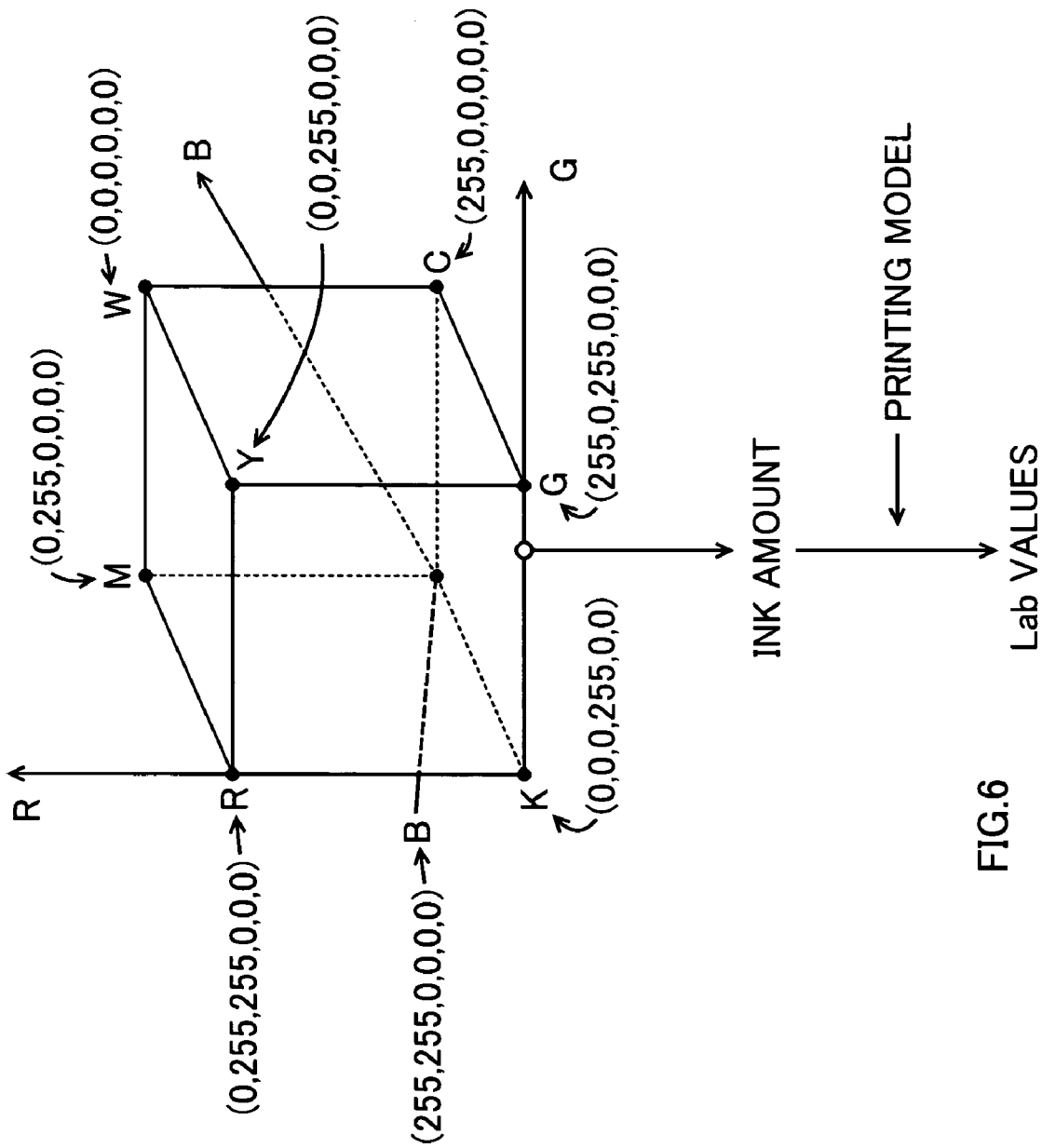
FIG. 6 illustrates an example of associating virtual ink amounts with orthogonal RGB grid points.

The initial LUT creation module 24 is a module for specifying the correspondence relationship between the above-described orthogonal RGB grid points and ink amount grid points. For this purpose the module first virtually associates the amounts of ink with respective orthogonal RGB grid points (step S110). In the present embodiment, this step S110 is equivalent to the processing of "acquiring the second correspondence relationship constituted by a plurality of correspondence relationships between the grid points and color values" or a processing in "the second correspondence relationship acquisition unit" in the claims. FIG. 6 shows an example of virtually associating the ink amounts to the orthogonal RGB grid points. The cube shown in the center of the Figure illustrates the range where the RGB grid points are present. In the present embodiment, the ink amount grid points that apparently form the outermost section of the color gamut are associated with eight apices in this cube.

More specifically, as shown in FIG. 6, (C, M, Y, K, lc, lm)=(0, 0, 0, 255, 0, 0) is associated by taking that (R, G, B)=(0, 0, 0) is K. Likewise, (C, M, Y, K, lc, lm)=(255, 0, 255, 0, 0, 0) is associated by taking that (R, G, B)=(0, 255, 0) is G, (C, M, Y, K, lc, lm)=(255, 0, 0, 0, 0, 0) is associated by taking that (R, G, B)=(0, 255, 255) is C, (C, M, Y, K, lc, lm)=(255, 255, 0, 0, 0, 0) is associated by taking that (R, G, B)=(0, 0, 255) is B, (C, M, Y, K, lc, lm)=(0, 255, 255, 0, 0, 0) is associated by taking that (R, G, B)=(255, 0, 0) is R, (C, M, Y, K, lc, lm)=(0, 0, 255, 0, 0, 0) is associated by taking that (R, G, B)=(255, 255, 0) is Y, (C, M, Y, K, lc, lm)=(0, 0, 0, 0, 0, 0) is associated by taking that (R, G, B)=(255, 255, 255) is W, and (C, M, Y, K, lc, lm)=(0, 255, 0, 0, 0, 0) is associated by taking that (R, G, B)=(255, 0, 255) is M.

The ink amounts corresponding to orthogonal RGB grid points other than the eight apices shown in FIG. 6 are determined by conducting the interpolation computation based on the above-described association. In this association, strict matching of colors is not required. Thus, it is not necessary that the colors obtained when the RGB data are sRGB and the output colors obtained with the associated CMYKlclm data match each other. In this sense, virtual ink amounts are associated in this association.

After the virtual ink amounts have thus been associated with respective orthogonal RGB grid points, the virtual ink amounts are transferred into the printing model computation module 25, and Lab values corresponding to each virtual amount of ink are calculated. The orthogonal RGB grid point creation unit 24a takes a LUT in which the obtained Lab values are associated with the original orthogonal RGB grid points as a target LUT 12b1 and stores it temporarily in the RAM 12b (step S115). In the present embodiment, the steps S110-S115 are equivalent to the processing of "acquiring the color values corresponding to a plurality of grid points" or a processing in the "color value acquisition unit" in the claims.

As a result of the above-described operations, the target LUT 12b1 where the orthogonal RGB grid points and Lab values are associated and the learning LUT 12b2 where the Lab values and amounts of ink are associated were created. By using those tables, the initial LUT 43 where the orthogonal RGB grid points and amounts of ink are associated can be created. In the present embodiment, this processing is carried out by the ink amount calculation unit 24b, and the amounts of ink corresponding to the orthogonal RGB grid points are calculated by the interpolation computation processing in a broad sense thereof.

For this purpose, first, the ink amount calculation unit 24b selects the object orthogonal RGB grid points to be associated with the ink amount grid points from the orthogonal RGB grid points defined in the target LUT 12b1 and conducts the interpolation computation in a broad sense thereof by referring to the learning LUT 12b2 (step S120). Thus, Lab values corresponding to the selected orthogonal RGB grid points are extracted by referring to the target LUT 12b1, data for n (n is integer of 2 or more) surrounding points are extracted from the Lab values recorded in the learning LUT 12b2, and interpolation in a broad sense thereof is implemented based on the following Equation (1).

Equation 1

$$\vec{i} = w_1 \cdot \vec{i}_1 + w_2 \cdot \vec{i}_2 + \ldots + w_n \cdot \vec{i}_n \quad (1)$$

$$\left( w_j = \frac{\frac{1}{d_j}}{\sum_{k=1}^{n} \frac{1}{d_k}} \right)$$

Here, the vector i indicates the ink amount that has to be associated with the selected orthogonal RGB grid points, vectors $i_1$ to $i_n$ indicate the ink amounts in the extracted n data, and $w_j$ ($w_1$ to $w_n$) are weighting factors for each ink amount defined in the parentheses. Furthermore, $d_j$ ($d_1$ to $d_n$) is the distance between Lab values corresponding to each ink amount and Lab values corresponding to the selected orthogonal RGB grid points.

Once the vector i has been calculated by the above-described interpolation computations, each component of the vector i is associated and the ink amount of each color with the selected orthogonal RGB grid point (step S125). Thus, the ink amounts that have to be associated with the orthogonal RGB grid points are obtained by multiplying each ink amount by a weighting factor proportional to the inverse value of the distance between the Lab values corresponding to each ink amount and Lab values corresponding to the selected orthogonal RGB grid points and then adding up them.

Once the ink amounts that have to be associated with the orthogonal RGB grid points have been determined by the above-described processing, a judgment is made as to whether the ink amounts have been associated with all the orthogonal RGB grid points created in the above-described step S105 (step S130). When the ink amounts are judged not to be associated with all the orthogonal RGB grid points in this step S130, the orthogonal RGB grid points that have not been associated with the ink amounts are selected as the orthogonal RGB grid points of the next cycle (step S135) and the processing of step S120 and subsequent steps is repeated.

In the present embodiment, the steps S120 to S135 are equivalent to the processing of "acquiring the third correspondence relationship constituted by a plurality of correspondence relationships of grid points and amounts of inks" or the processing in "the third correspondence relationship acquisition unit" in the claims. When the ink amounts are judged in the step S130 to be associated with all the orthogonal RGB grid points, the data indicating the determined correspondence relationship are saved as the initial LUT 43 in the hard disk 13b (step S140).

As described hereinabove, in accordance with the invention, the initial LUT 43 for producing a color no-correction LUT is acquired without conducting color separation by a trial and error method and the initial LUT 43 is produced automatically by the computer 12. Therefore, the LUT can be produced much easier and faster than by the conventional LUT production method. Furthermore, the learning LUT 12b2 acquired when the initial LUT 43 is produced can be selected by any method and this selection can be conducted without the necessity to follow any special rule. Thus, in accordance with the invention, because smoothing and color matching by colorimetry are conducted based on the initial LUT 43, restrictions applied to the production of the initial LUT 43 can be greatly reduced and the initial LUT 43 and color correction LUT 41 can be produced in a very easy manner.

4 Smoothing Processing

Figure 7:
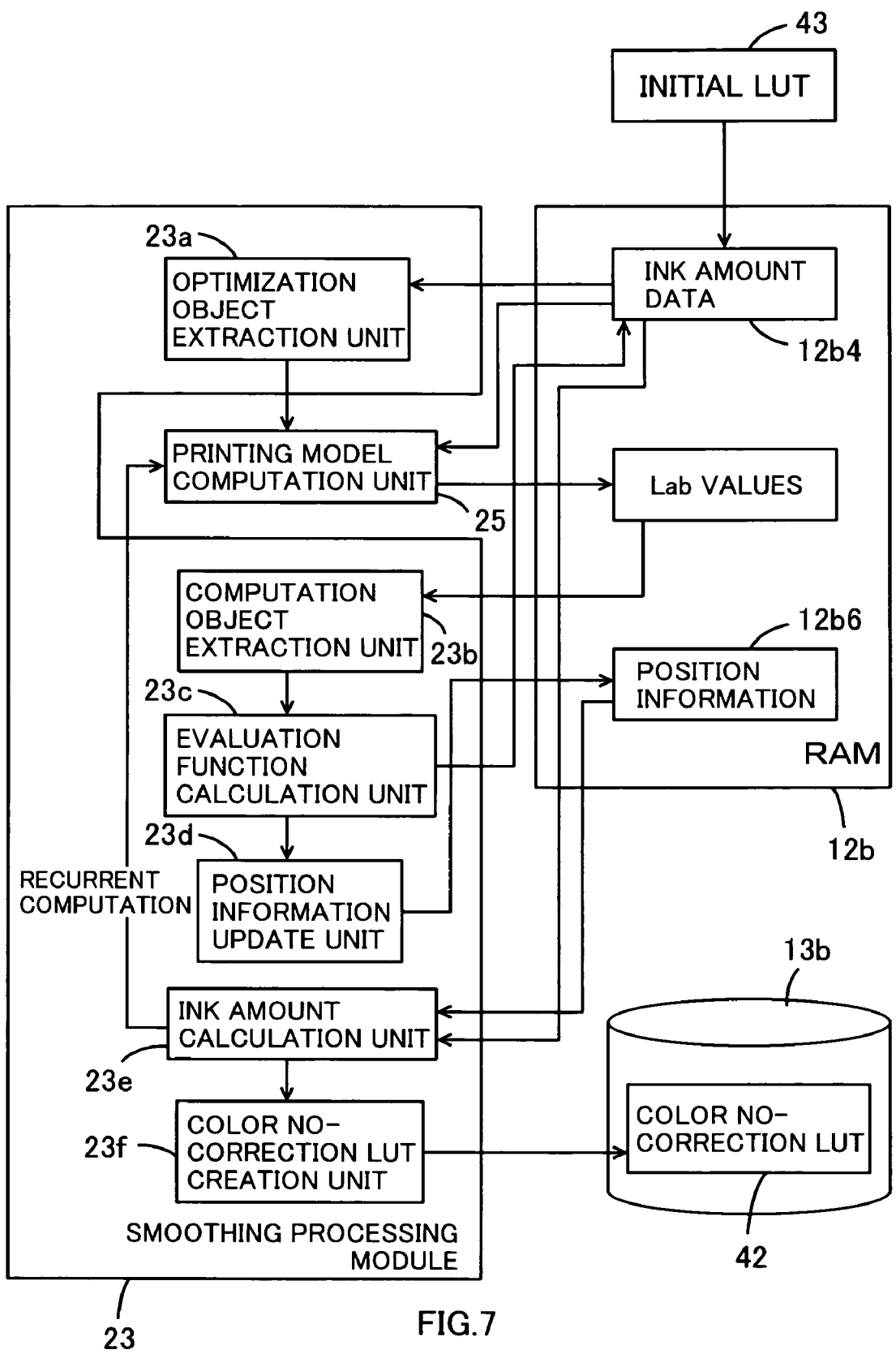
FIG. 7 is a block diagram illustrating the configuration of a smoothing processing module.
Figure 8:
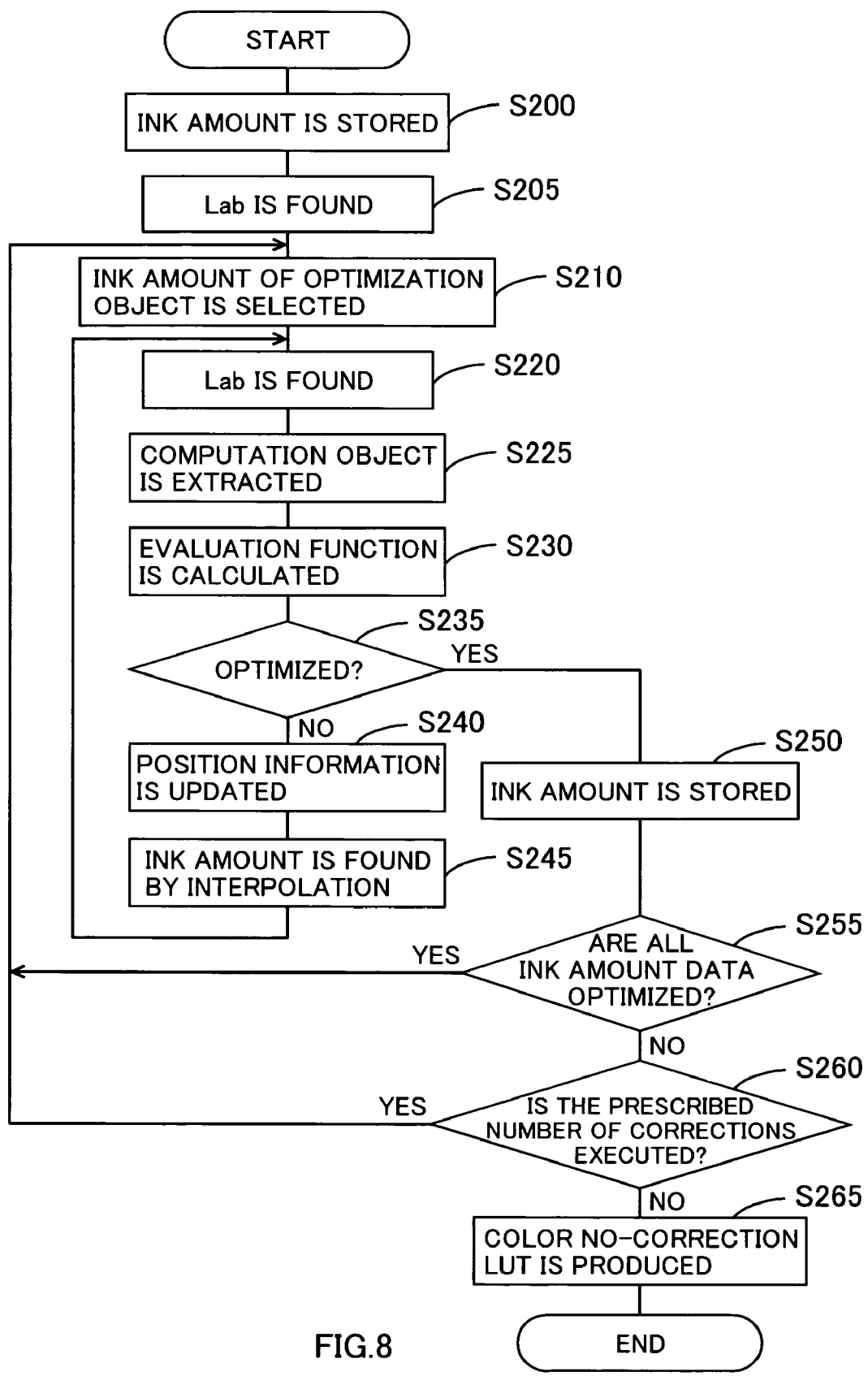
FIG. 8 is a flowchart illustrating the smoothing processing.

The aforementioned smoothing processing will be described below in greater manner. FIG. 7 is a block diagram illustrating the configuration of the smoothing processing module 23. FIG. 8 is a flowchart illustrating the processing executed in the smoothing processing module 23. The smoothing processing module 23 comprises an optimization object extraction unit 23a, a computation object extraction unit 23b, an evaluation function calculation unit 23c, a position information update unit 23d, an ink amount calculation unit 23e, and color no-correction LUT creation unit 23f.

In the present embodiment, the smoothing is performed by using the initial LUT 43. For this purpose, first, the optimization object extraction unit 23a stores the CMYKlclm data specified in the initial LUT 43 as ink amount data 12b4 in the RAM 12b (step S200). Furthermore, the printing model computation module 25 calculates the Lab values of the colors that will be printed with the ink amount data 12b4 by the below described computation (step S205).

The optimization object extraction unit 23a then extracts the CMYKlclm data that have not been subjected to smoothing processing as an optimization object from a plurality of data that were stored as the ink amount data 12b4 in step S210. The printing model computation module 25 calculates the Lab values corresponding this CMYKlclm data in step S220. In the initial stage of the below-described loop, all the Lab values are already calculated. Therefore, it is not necessary to recalculate the Lab values. However, after the position information has been updated as described hereinbelow, the Lab values corresponding to the ink amount after updating are calculated.

The smoothing is conducted by using the Lab value corresponding to the CMYKlclm data that is the optimization object and the Lab values relating to the grid points surrounding the optimization object Accordingly, in step S225, the computation object extraction unit 23b extracts the Lab values relating to the grid points present around the Lab grid point that is the optimization object and adjacent to this grid point. Here, the Lab values that are extracted differ depending on the spatial position of the Lab grid point that is the optimization object; this will be described below in greater detail.

In step S230, the evaluation function calculation unit 23c calculates the evaluation function by using the extracted grid point that is the optimization object and using the grid points adjacent thereto. The evaluation function is a function whose value decreases as the arrangement of the Lab grid point that is the optimization object is smoothed, and the variable thereof is the above-described position information specifying the RGB grid point position in the initial LUT 43. Thus, if the position information is adjusted, then the Lab values corresponding a RGB grid point after the adjustment changes, and the optimized position information (position information for which the evaluation function was minimized) is obtained. The form of the evaluation function also differs depending on the spatial position of the Lab grid point that is the optimization object, and the evaluation function is created by selecting an appropriate function form by the spatial position of the Lab grid point. This will also be described below in grater detail.

Furthermore, the evaluation function calculation unit 23c calculates the value of the evaluation function calculated in the above-described step S230 and judges whether or not this value is equal to or less than a predetermined threshold value in S235. Thus, when the value of the evaluation function is equal to or less than the predetermined threshold value, the position of the Lab grid point is considered to the optimized (sufficiently smoothed). When the position of the Lab grid point is judged to be not optimized in step S235, the position information update unit 23d updates the position information to the optimized position information in step S240 and records it as a position information 12b6 in the RAM 12b.

Once the position information has been updated, the calculation of the value of evaluation function based on the ink amount corresponding to the RGB grid point specified by the position information that has been updated is conducted again, for judging whether or not the Lab values of the optimization object have been optimized. Thus, in step S245, the ink amount calculation unit 23e refers to the position information 12b6 and calculates the ink amount (CMYKlclm data) corresponding to the updated position information. At this time, the ink amount corresponding to the updated position information is calculated by the interpolation processing with reference to the ink amount data 12b4.

If the ink amount corresponding to the updated position information can thus be calculated, the Lab value after updating can be calculated from this amount of ink. Therefore, by repeating the processing of step S220 and subsequent steps, the value of the evaluation function can be converged to the predetermined threshold value or below it and the position of the Lab grid point can be optimized. Thus, by repeating the processing of step S220 and subsequent steps till the position information is optimized by the evaluation function (the value of the evaluation function is minimized) and the Lab grid points are thereby optimized (grid point arrangement is smoothed), the grid point arrangement is converged to optimum positions. Various algorithms such as a quasi-Newton method and a conjugate gradient method can be employed as specific algorithms of the optimization processing.

On the other hand, when the position of the Lab grid point has been judged to be optimized in step S235, in step S250, the ink amount data 12b4 is overwritten with the amount of ink corresponding to the Lab value at the time of optimization, and in step S255, it is determined whether or not the optimization has been completed with respect to all the ink amount data 12b4. The processing of step S210 and subsequent steps is repeated till the optimization can be judged in step S255 to be completed with respect to all the ink amount data 12b4.

Furthermore, in step S260, it is decided whether the number of correction cycles that was set in advance has been executed, and the processing of step S210 and subsequent steps is repeated till a decision is made that the predetermined number correction cycles have been executed. Thus, by executing the predetermined number of correction cycles, the results of the optimization processing are guaranteed to be a true solution. In step S260, it may be guaranteed that the optimization has been sufficiently conducted as a whole. Therefore, a decision may be made with respect to all the ink amounts as to whether or not the value of the evaluation function or the average value thereof has become equal to or less than the predetermined threshold value. Furthermore, a variety of configurations can be employed for the estimation. For example, the optimization may be determined to be sufficient when the average value of the values of evaluation function is almost constant in the (n−1)-th correction and the n-th correction.

After the grid point arrangement has thus been sufficiently smoothed, the RGB data and the ink amount data indicating the colors smoothed in the Lab color space can be associated with each other by associating the ink amount data 12b4 with the RGB data specified in the initial LUT 43. Accordingly, in step S265, the color no-correction LUT creation unit 23f overwrites the CMYKlclm data specified in the initial LUT 43 with the ink amount data 12b4, thereby creating the color no-correction LUT 42 with a smoothed grid point arrangement, and records this table in the hard disk 13b. With the above-described processing, the color no-correction LUT 42 enabling the implementation of highly accurate interpolation processing can be created. In the present embodiment, steps S200 to S265 are equivalent to the processing of "producing a profile" or the processing in the "profile production unit" in the claims.

5 Optimization with Evaluation Functions

Figure 9:
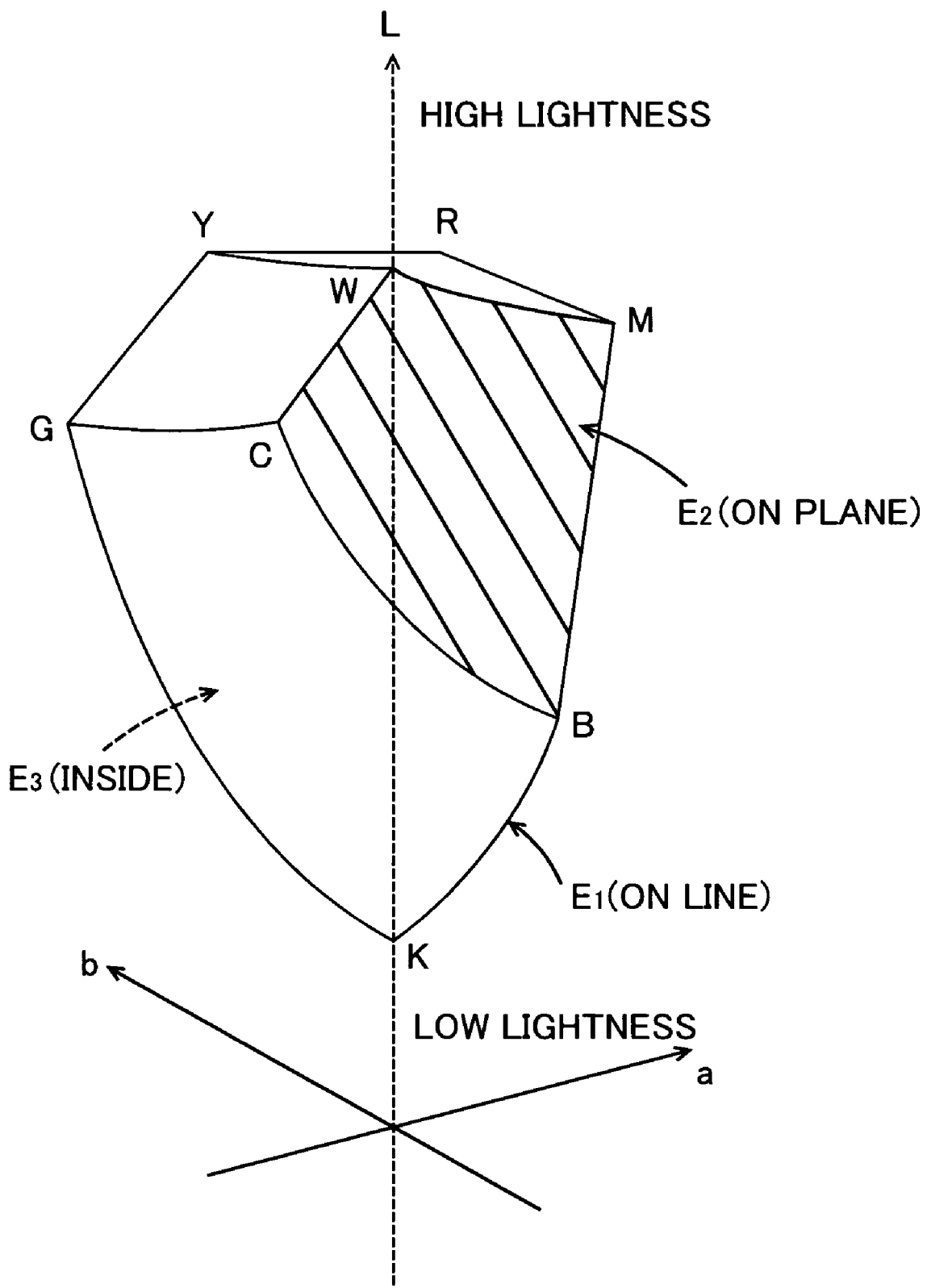
FIG. 9 is a typical diagram representing a color gamut of a printer.

The optimization processing with evaluation functions in steps S220 to S240 will be described below in greater detail. FIG. 9 is a schematic drawings showing a color gamut of the printer 17 in the Lab color space. The color gamut of the printer 17 has a distorted shape in the Lab color space as shown in the same Figure. As for the Lab values, if the Lab values calculated in step S205 are plotted in the Lab color space, then a figure identical to the cube shown in FIG. 9 is obtained. On the other hand, if the orthogonal RGB grid points of the initial LUT 43 are plotted in the RGB color space, a cube shown in the upper left section of FIG. 2 is obtained.

The color gamut in the Lab color space has a distorted shape, but the color gamut boundaries can be easily associated with the color gamut boundaries in the RGB color space. Thus, the color gamut boundaries in the RGB color space are 12 edge lines and 6 exterior planes forming the outer contour of a cube, but the boundaries of color gamut in the Lab color space are also composed of 12 edge lines and 6 exterior planes. More specifically, if the R, G components are fixed to minimum values and only the B components is taken to have a finite value along an edge line on the B axis from the point of origin in the RGB color space, then the color will change from K to B, and the colors in the Lab color space corresponding to those colors will be on the edge line shown by $E_1$ in FIG. 9.

Likewise, the colors of the apices in the uppermost plane of the cube shown in the upper left section of FIG. 2 are BWCM (W is white) respectively, and the colors on this plane can be represented by fixing only the B component to the maximum value and randomly changing other components. The colors on this plate are on the plane shown by $E_2$ in the color gamut shown in FIG. 9. Therefore, if any one of the RGB data of the initial LUT has a maximum value or a minimum value, this color can be said to be present on the color gamut boundary. If it is possible to move freely inside the Lab color space during the above-described optimization with respect to the colors on the color gamut boundary, then a sufficiently large size of color gamut might not be possible to ensure. Accordingly, in the present embodiment, in order to maintain the size of the color gamut, evaluation functions are acquired that have different function forms on 12 edge lines, 6 exterior planes, and inside the color gamut.

5-1 Evaluation Function $E_1$

Figure 10:
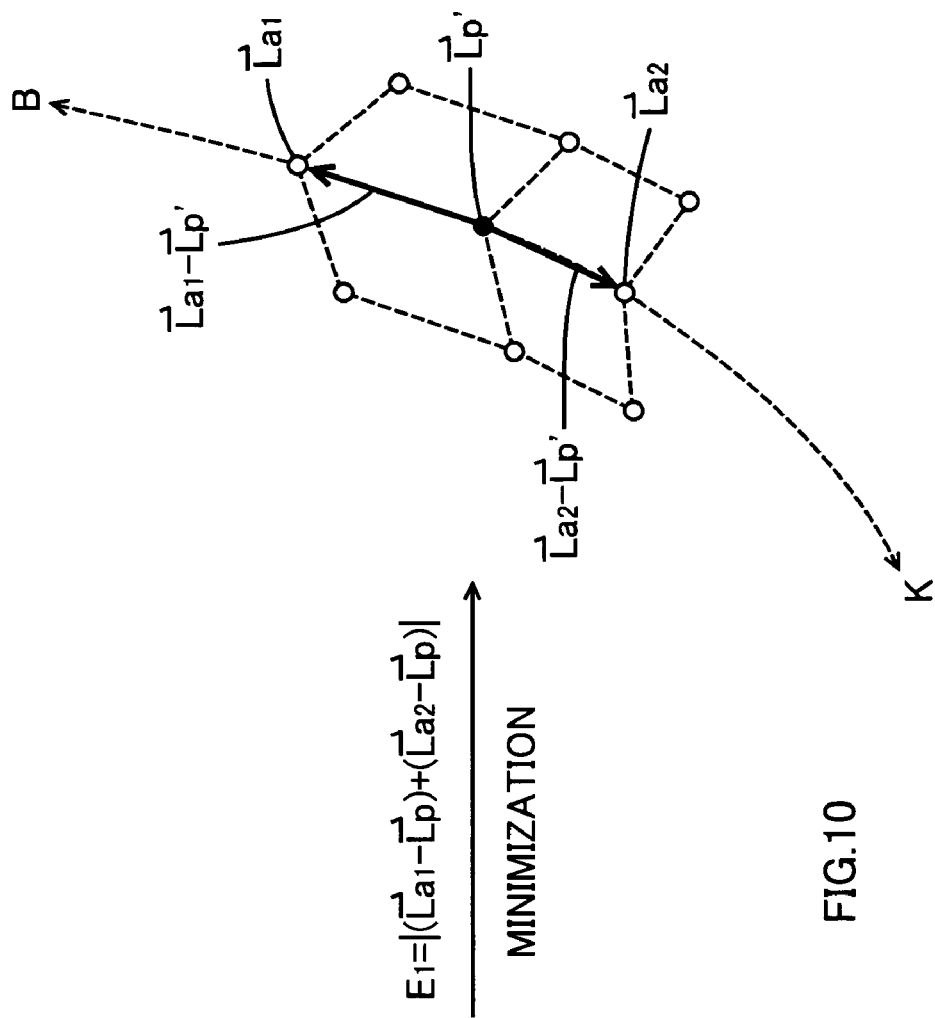
FIG. 10 is an explanatory drawing illustrating an evaluation function for optimizing grid points on an edge line.
Figure 10:
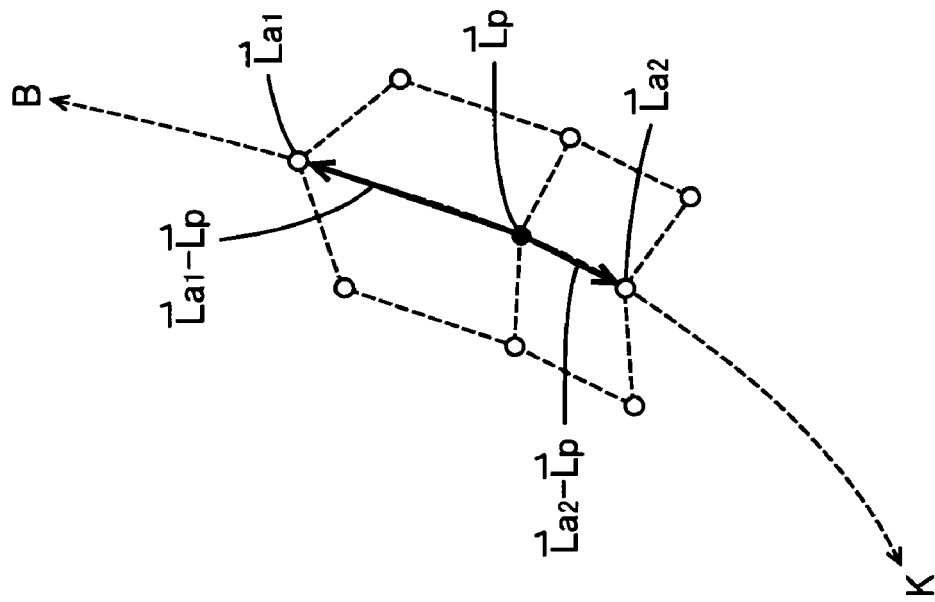

FIG. 10 is an explanatory drawing illustrating an evaluation function for optimizing the grid points on the edge lines formed by the boundaries of color gamut in the Lab color space. The curves shown by broken lines in the figure are edge lines formed by the color gamut boundaries. Furthermore, the grid point that is an optimization object is shown by a black circle; the grid points located around it are shown by white circles. In order to maintain the size of the color gamut, the grid point, which is the optimization object represented by the black circle, has to be present on the edge line shown by a broken line. Accordingly, in the present embodiment, when the optimization object extraction unit 23a extracts the grid point present on the edge line represented by the broken line, as shown in FIG. 10, as the optimization object, in the computation object extraction unit 23b, the grid points present on the edge line shown by a broken line and adjacent to the grid point that is the optimization object are extracted as grid points that are the computation objects.

In the same figure, the grid point that is the optimization object is shown by a vector $L_p$, and the grid points that are extracted by the computation object extraction unit 23b are shown by a vector $L_{a1}$ and a vector $L_{a2}$. Here, the vector $L_p$ is calculated by Equation (2) shown below and this vector is represented by using the above-described position information (Pr, Pg, Pb) as a variable. In the present embodiment, the position information may be a value that can specify the RGB grid point position of the initial LUT and is a variable that can uniquely specify the Lab value.

Equation 2

$$\vec{L} = f(Pr, Pg, Pb) \quad (2)$$

Furthermore, f in the equation is a function for finding Lab vector $L_p$ from the position information (Pr, Pg, Pb); the equation used for calculating the amount of ink corresponding to the position information (Pr, Pg, Pb) by interpolation computations and computing the Lab values with the printing model computation module 25 is taken as the f function.

The evaluation function can be calculated by the following Equation (3) by using the vector $L_p$, vector $L_{a1}$, and vector $L_{a2}$.

Equation 3

$$E_1 = |(\vec{L_{a1}} - \vec{L_p}) + (\vec{L_{a2}} - \vec{L_p})| \quad (3)$$

Thus, the value of the function becomes minimal when the distances between the grid point that is the optimization object and the grid points adjacent thereto on both sides are equal to each other and the orientations thereof are directly opposite, and the value of the function increases as the difference between the distances increases and the orientations thereof shift from the directly opposite.

Because the grid point arrangement tends to be smoothed if the grid points are arranged uniformly, a vector $L'_p$ for which the position of the grid point of the vector $L_p$ was optimized, as shown on the right side of FIG. 10, can be acquired by minimizing the function $E_1$ shown in Equation (3). Furthermore, the vector $L_p$, vector $L_{a1}$, and vector $L_{a2}$ are represented by the position information (Pr, Pg, Pb), but in the evaluation function $E_1$, the position information giving the vector $L_{a1}$ and vector $L_{a2}$ is fixed, and in the position information (Pr, Pg, Pb) giving the vector $L_p$, only one parameter is variable, whereas the other two are fixed to minimum or maximum values. For example, the color on the edge line shown by the broken line in FIG. 10 is present between B and K, the position information Pr, Pg specifying the RGB grid point equivalent to this color has a minimum value, and the position information Pb has any value. Accordingly, the position information Pr, Pg may be fixed to a minimum value and Pb may be varied to move the grid point located in the Lab color space along the edge line.

The same is true for other edge lines of the color gamut boundaries, and when the grid point that is the optimization object is present on the edge line from K to R on the color gamut boundary, the position information Pg, Pb is fixed to a minimum value and Pr is varied. When the grid point that is the optimization object is present on the edge line from K to G on the color gamut boundary, the position information Pr, Pb is fixed to a minimum value and Pg is varied. Furthermore, when the grid point that is the optimization object is present on the edge line from W to C on the color gamut boundary, the position information Pg, Pb is fixed to a maximum value and Pr is varied. When the grid point that is the optimization object is present on the edge line from W to M on the color gamut boundary, the position information Pr, Pb is fixed to a maximum value and Pg is varied. When the grid point that is the optimization object is present on the edge line from W to Y on the color gamut boundary, the position information Pr, Pg is fixed to a maximum value and Pb is varied.

Furthermore, when the grid point that is the optimization object is present on the edge line from M to R on the color gamut boundary, the position information Pr is fixed to a maximum value, Pg is fixed to a minimum value, and Pb is varied. When the grid point that is the optimization object is present on the edge line from M to B on the color gamut boundary, the position information Pb is fixed to a maximum value, Pg is fixed to a minimum value, and Pr is varied. When the grid point that is the optimization object is present on the edge line from C to G on the color gamut boundary, the position information Pg is fixed to a maximum value, Pr is fixed to a minimum value, and Pb is varied. When the grid point that is the optimization object is present on the edge line from C to B on the color gamut boundary, the position information Pb is fixed to a maximum value, Pr is fixed to a minimum value, and Pg is varied.

When the grid point that is the optimization object is present on the edge line from Y to R on the color gamut boundary, the position information Pr is fixed to a maximum value, Pb is fixed to a minimum value, and Pg is varied. When the grid point that is the optimization object is present on the edge line from Y to G on the color gamut boundary, the position information Pg is fixed to a maximum value, Pb is fixed to a minimum value, and Pr is varied. As described hereinabove, if the evaluation function is minimized by appropriately varying the position information that changes depending on the position of the grid point that is the optimization object, the position information that causes the minimization of the evaluation function $E_1$ at this point in time can be calculated and the vector $L'_p$ with optimized grid point position can be acquired by repeating this processing.

5-2 Evaluation Function $E_2$

Figure 11:
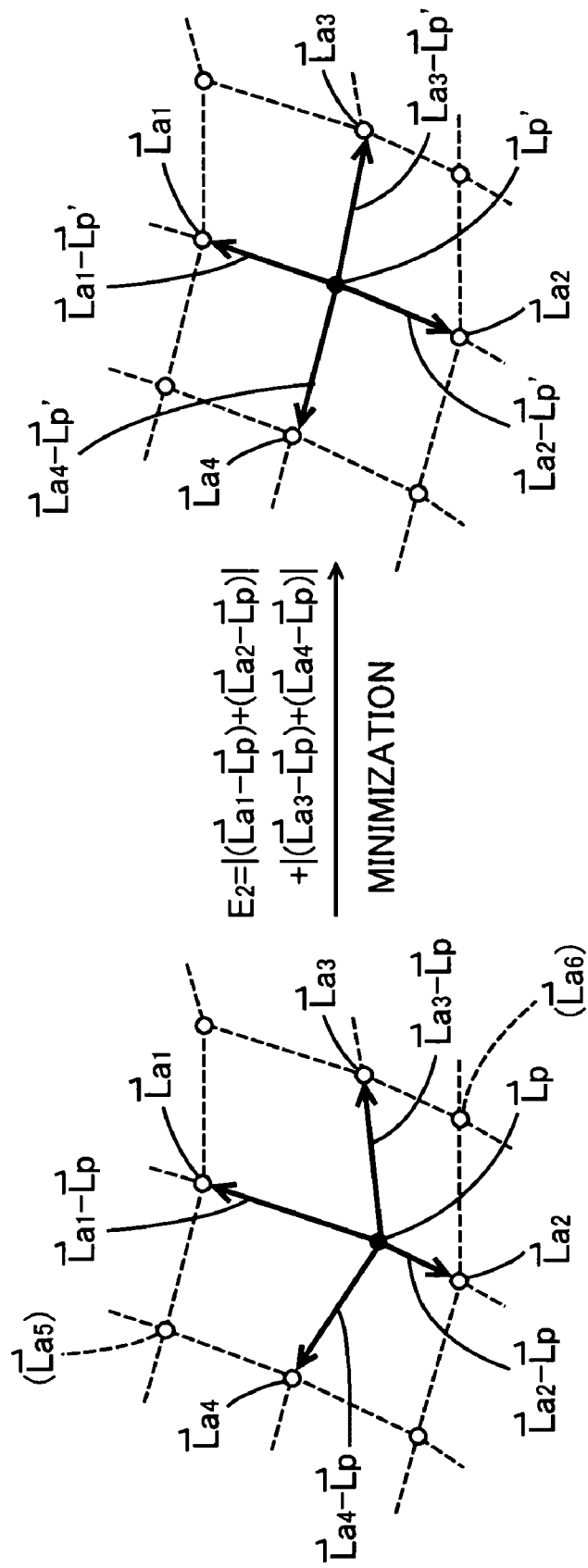
FIG. 11 is an explanatory drawing illustrating an evaluation function for optimizing grid points on an external plane.

FIG. 11 is an explanatory drawing illustrating an evaluation function for optimizing the grid points on the exterior planes formed by the boundaries of color gamut in the Lab color space. The broken lines in the figure are straight lines connecting the grid points. Because the grid points are present on the exterior planes of the color gamut boundaries, other grid points are present only on the farther side or the front side of the paper surface. Furthermore, the grid point that is an optimization object is shown by a black circle; the grid points located around it are shown by white circles. In order to maintain the size of the color gamut, the grid point that is the optimization object is not allowed to move significantly in the direction perpendicular to the exterior plane where the grid points shown by white circles and black circles are present. Accordingly, in the present embodiment, when the optimization object extraction unit 23a extracts a grid point present on the exterior plane of the color gamut boundary that is shown by a black circle in FIG. 11 as the optimization object, four grid points that are present on the exterior planes of the color gamut boundaries and are adjacent on four sides to the grid point that is the optimization object are extracted as the grid points that are the computation objects, in the computation object extraction unit 23b.

In this figure, too, the grid point that is the optimization object is shown by the vector $L_p$, and the grid points that are extracted by the computation object extraction unit 23b are shown by vectors $L_{a1}$ to $L_{a4}$. Here, the vector $L_p$ is calculated by the Equation (2) presented hereinabove, and represented by using the position information (Pr, Pg, Pb) as variables. The evaluation function for optimizing the grid points present on the exterior plane of the color gamut boundaries can be represented by the following Equation (4) by using the vector $L_p$ and vectors $L_{a1}$ to $L_{a4}$.

Equation 4

$$E_2 = |(\vec{L_{a1}} - \vec{L_p}) + (\vec{L_{a2}} - \vec{L_p})| + |(\vec{L_{a3}} - \vec{L_p}) + (\vec{L_{a4}} - \vec{L_p})| \quad (4)$$

Thus, the value of the evaluation function decreases when the distances of the oppositely oriented vectors from the grid point that is the optimization object are equal and when the orientations are close to directly opposite to each other.

The lines connecting the adjacent grid points (in FIG. 11, the lines passing through the grid points shown by vector $L_{a1}$–vector $L_p$–vector $L_{a2}$) are close to straight lines. Furthermore, the grid point arrangement tends to be smoothed if the grid points are arranged uniformly. Therefore, the vector $L'_p$ in which the grid point positions of the vector $L_p$ were optimized as shown on the right side of FIG. 11 can be acquired by minimizing the function $E_2$ shown in Equation (4). Furthermore, the vector $L_p$, and vectors $L_{a1}$ to $L_{a4}$ are represented by the position information (Pr, Pg, Pb), but in the evaluation function $E_2$, in the position information (Pr, Pg, Pb) giving the vector $L_p$, only two any parameters are variable, whereas the remaining one is fixed to a minimum or maximum value. For example, the color on the exterior plane WMBC of the color gamut boundary shown by hatching in FIG. 9 is a color relating to the case where the B component is maximum and the R component and G component are changed arbitrarily. The position information Pb of the RGB point relating to this color assumes a maximum value, and the position information Pr, Pg takes arbitrary values. Accordingly, the position information Pb may be fixed to the maximum value and Pr and Pg may be varied to move the grid point located in the Lab color space on the exterior plane WMBC.

The same is true with respect to other exterior planes of the color gamut boundaries. The color on the exterior plane MRKB of the color gamut boundary is a color relating to the case where the G component is minimum and the R component and B component are changed arbitrarily. If the position information Pg is fixed to the minimum value and Pr and Pb are varied, the grid point that is the optimization object can be moved on the exterior plane MRKB. The color on the exterior plane RYGK of the color gamut boundary is a color relating to the case where the B component is minimum and the R component and G component are changed arbitrarily. If the position information Pb is fixed to the minimum value and Pr and Pg are varied, the grid point that is the optimization object can be moved on the exterior plane RYGK.

Furthermore, the color on the exterior plane YWCG of the color gamut boundary is a color relating to the case where the G component is maximum and the R component and B component are changed arbitrarily. If the position information Pg is fixed to the maximum value and Pr and Pb are varied, the grid point that is the optimization object can be moved on the exterior plane YWCG. The color on the exterior plane WYRM of the color gamut boundary is a color relating to the case where the R component is maximum and the G component and B component are changed arbitrarily. If the position information Pr is fixed to the maximum value and Pg and Pb are varied, the grid point that is the optimization object can be moved on the exterior plane WYRM.

The color on the exterior plane CGKB of the color gamut boundary is a color relating to the case where the R component is minimum and the G component and B component are changed arbitrarily. If the position information Pr is fixed to the minimum value and Pg and Pb are varied, the grid point that is the optimization object can be moved on the exterior plane CGKB. If the evaluation function $E_2$ is minimized by selecting the position information that position information that changes depending on the position of the grid point that is the optimization object, the position information that causes the minimization of the evaluation function at this point in time can be calculated and the vector $L'_p$ with the optimized grid point position can be acquired by repeating this processing.

5-3 Evaluation Function $E_3$

Figure 12:
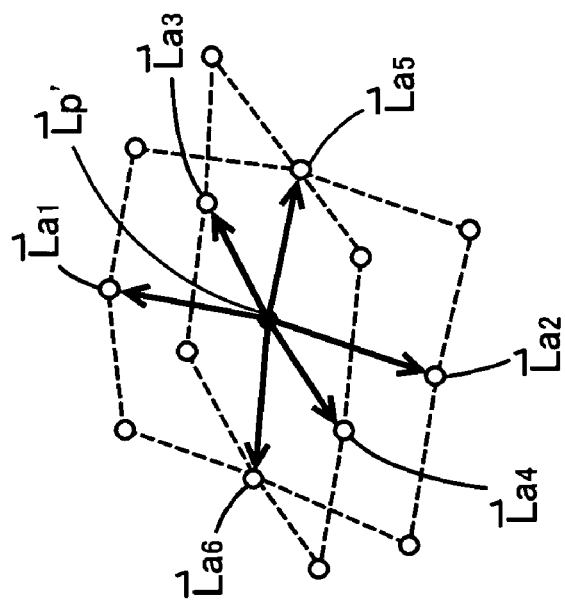
FIG. 12 is an explanatory drawing illustrating an evaluation function for optimizing grid points inside the color gamut.
Figure 12:
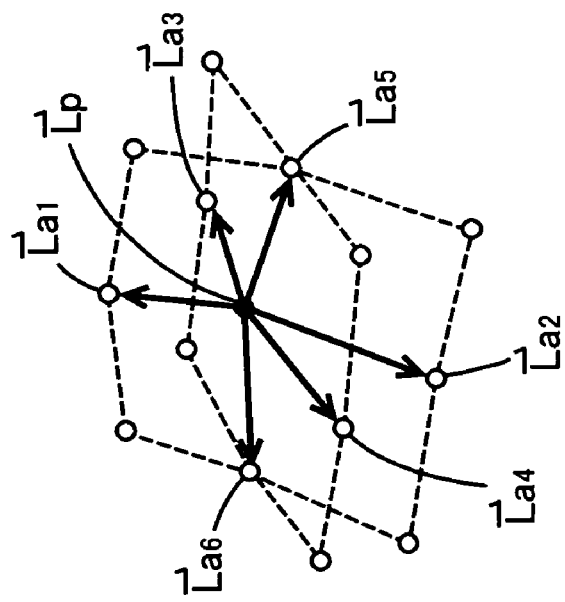

FIG. 12 is an explanatory drawing illustrating an evaluation function for optimizing the grid points present inside the color gamut, that is, beyond the boundaries thereof, in the Lab color space. The broken lines in the figure are straight lines connecting a plurality of grid points present on the surface formed by cutting the color gamut in two directions. The grid point that is the optimization object is shown by a black circle and the grid points located around it are shown by white circles. In the present embodiment, the grid points located inside the color gamut are freely moved without setting conditions for maintaining the size of the color gamut. Accordingly, in the present embodiment, when the optimization object extraction unit 23a extracts the grid point present inside the color gamut and shown in FIG. 12 as the optimization object, in the computation object extraction unit 23b, six grid points that are adjacent on six sides to the grid point that is the optimization object are extracted as the grid point that are the computation objects.

In this figure, too, the grid point that is the optimization object is shown by the vector $L_p$, and the grid points that are extracted by the computation object extraction unit 23b are shown by vectors $L_{a1}$ to $L_{a6}$. Here, the vector $L_p$ is calculated by the Equation (2) presented hereinabove, and represented by using the position information (Pr, Pg, Pb) as variables. The evaluation function for optimizing the grid points present inside the color gamut can be represented by the following Equation (5) by using the vector $L_p$ and vectors $L_{a1}$ to $L_{a6}$.

Equation 5

$$E_3 = |(\vec{L_{a1}} - \vec{L_p}) + (\vec{L_{a2}} - \vec{L_p})| + \\ |(\vec{L_{a3}} - \vec{L_p}) + (\vec{L_{a4}} - \vec{L_p})| + |(\vec{L_{a5}} - \vec{L_p}) + (\vec{L_{a6}} - \vec{L_p})| \quad (5)$$

Thus, the value of the evaluation function decreases when the distances of the oppositely oriented vectors from the grid point that is the optimization object are equal and when the orientations are close to directly opposite to each other.

The lines connecting the adjacent grid points (in FIG. 12, the lines passing through the grid points shown by vector $L_{a1}$–vector $L_p$–vector $L_{a2}$) are close to straight lines. Furthermore, the grid point arrangement tends to be smoothed if the grid points are arranged uniformly. Therefore, the vector $L'_p$ in which the grid point positions of the vector $L_p$ were optimized as shown on the right side of FIG. 12 can be acquired by minimizing the function $E_3$ shown in Equation (5).

Furthermore, the vector $L_p$, and vectors $L_{a1}$ to $L_{a6}$ are represented by the position information (Pr, Pg, Pb), but in the evaluation function $E_3$, all the parameters of the position information (Pr, Pg, Pb) giving the vector $L_p$ are variable. If the evaluation function $E_3$ is minimized by changing the position information, then the position information that causes the minimization of the evaluation function at this point in time can be calculated and the vector $L'_p$ with the optimized grid point position can be acquired by repeating this processing.

6 Printing Model

An example of the printing model will be described below. The printing model explained hereinbelow is a model called the cellular Yule-Nielsen spectral Neugebauer model. This model is based on the well-known spectral Neugebauer model and Yule-Nielsen model. The following description assumes a mode that employed the three inks of CMY, but the model can readily be expanded to one using an arbitrary plurality of inks.

Figure 13:
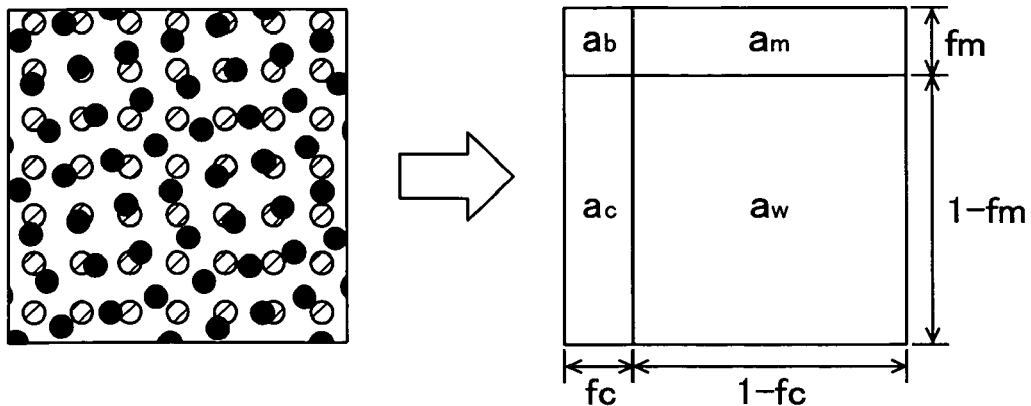
FIG. 13 illustrates a spectral Neugebauer model.
Figure 13:
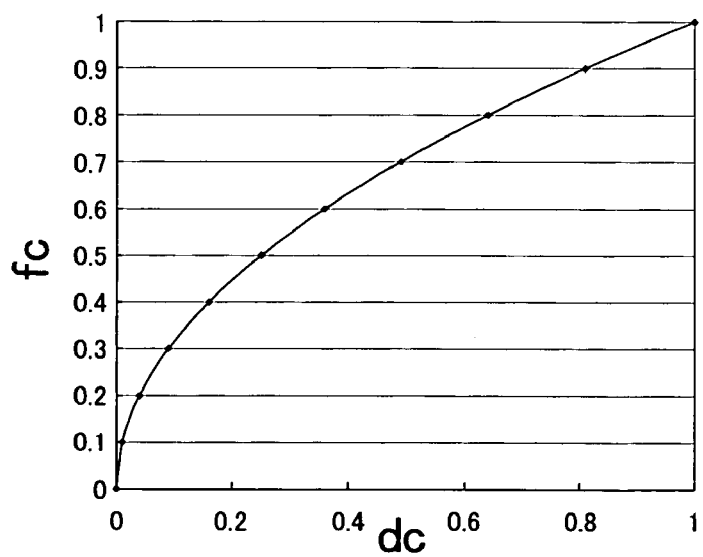

FIG. 13 illustrates the spectra Neugebauer model (a model for calculating the spectral reflectance from the printing state of the ink such as show on the left side in FIG. 13). In the spectral Neugebauer model, spectral reflectance $R(\lambda)$ of any printout is given by Equation (6) below.

Equation 6

$$R(\lambda) = a_w R_w(\lambda) + a_c R_c(\lambda) + a_m R_m(\lambda) + \qquad (6)$$
$$a_y R_y(\lambda) + a_r R_r(\lambda) + a_g R_g(\lambda) + a_b R_b(\lambda) + a_k R_k(\lambda)$$

$a_w = (1-f_c)(1-f_m)(1-f_y)$ $a_c = f_c(1-f_m)(1-f_y)$ $a_m = (1-f_c)f_m(1-f_y)$ $a_y = (1-f_c)(1-f_m)f_y$ $a_r = (1-f_c)f_m f_y$ $a_g = f_c(1-f_m)f_y$ $a_b = f_c f_m (1-f_y)$ $a_k = f_c f_m f_y$

Here, $a_i$ is the planar area percentage of the i-th area, $R_i(\lambda)$ is a spectral reflectance of the i-th area. The subscript i denotes respectively an area (w) without ink, an area (c) where cyan ink only is recorded, an area (m) where magenta ink only is recorded, an area (y) where yellow ink only is recorded, an area (r) where magenta ink and yellow ink are recorded, and area (g) where yellow ink and cyan ink are recorded, an area (b) where cyan ink and magenta ink are recorded, and area (k) where the three CMY inks are recorded. Furthermore, $f_c$, $f_m$, $f_y$ denote the percentage of area covered by ink (termed "ink area coverage") when only one of the CMY inks is ejected. Spectral reflectance $R_i(\lambda)$ can be acquired by measuring a color path with a spectral reflectance meter.

Ink area coverage $f_c$, $f_m$, $f_y$ is given by the Murray-Davies model shown in FIG. 13B. In the Murray-Davies model, ink area coverage $f_c$ of cyan ink, for example, is a nonlinear function of the cyan ink ejection amount $d_c$, and is given by a one-dimensional lookup table. The reason why the ink area coverage is a nonlinear function of ink ejection amount is that when a small amount of ink is ejected onto a unit surface area, the ink is spread sufficiently, but when a large amount is ejected, the ink overlaps and, therefore, there is no much increase in the covered surface area.

If the Yule-Nielsen model relating to the spectral reflectance is employed, Equation (6) above can be rewritten as Equation (7a) or Equation (7b) below.

Equation 7a $$R(\lambda)^{1/n} = a_w R_w(\lambda)^{1/n} + a_c R_c(\lambda)^{1/n} + a_m R_m(\lambda)^{1/n} + a_y R_y(\lambda)^{1/n} + a_r R_r(\lambda)^{1/n} + a_g R_g(\lambda)^{1/n} + a_b R_b(\lambda)^{1/n} + a_k R_k(\lambda)^{1/n} \qquad (7a)$$

Equation 7b $$R(\lambda) = \{a_w R_w(\lambda)^{1/n} + a_c R_c(\lambda)^{1/n} + a_m R_m(\lambda)^{1/n} + a_y R_y(\lambda)^{1/n} + a_r R_r(\lambda)^{1/n} + a_g R_g(\lambda)^{1/n} + a_b R_b(\lambda)^{1/n} + a_k R_k(\lambda)^{1/n}\}^n \qquad (7b)$$

Here, n is a predetermined equal to 1 or greater, e.g. n=10. Equation (7a) and Equation (7b) are equations representing the Yule-Nielsen Spectral Neugebauer model.

The cellular Yule-Nielsen spectral Neugebauer model is obtained by divining the space formed by the ink area coverage in the above-described of the Yule-Nielsen spectral Neugebauer model into a plurality of cells.

Figure 14:
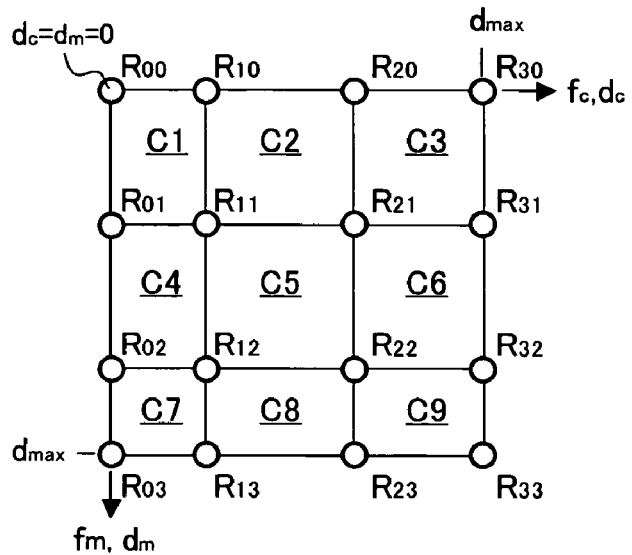
FIG. 14 illustrates a cellular Yule-Nielsen spectral Neugebauer model.
Figure 14:
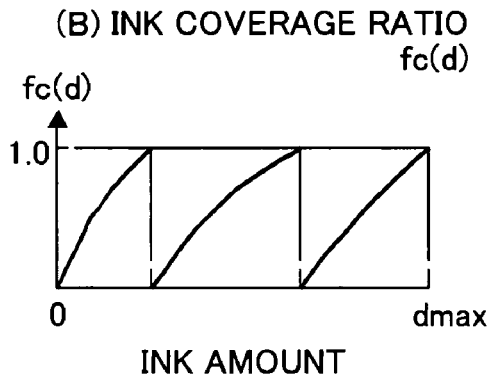
Figure 14:
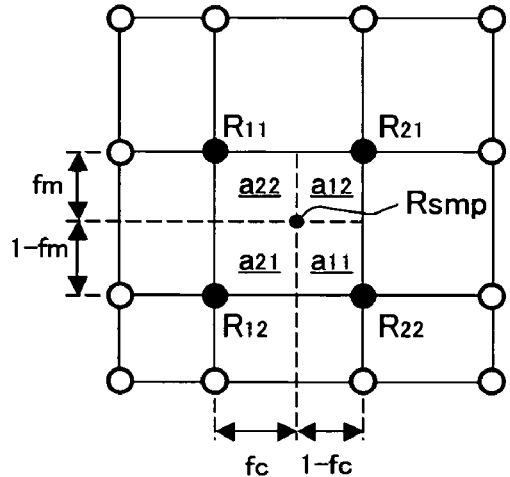

FIG. 14A shows an example of cell division in the cellular Yule-Nielsen spectral Neugebauer model. Here, for simplicity, cell division is drawn in a two-dimensional space including two axes, namely for cyan ink area coverage $f_c$ and magenta ink area coverage $f_m$. These axes $f_c$, $f_m$ may also be considered as axes representing ink ejection amounts $d_c$, $d_m$. The white circles denote grid points (termed "notes"); the two-dimensional space is divided into nine cells C1 to C9. Spectral reflectance $R_{00}$, $R_{10}$, $R_{20}$, $R_{30}$, $R_{01}$, $R_{11}$, ... $R_{33}$ is predetermined for the printout (color patch) at each of 16 nodes.

FIG. 14B shows the shape of ink area coverage $f_c(d)$ corresponding to this cell division. Here, the that 0 to $d_{max}$ of amount of ink for an ink of one type is divided into three intervals; the ink area coverage $f_c(d)$ is represented by a curve that increases monotonously from 0 to 1 in each interval.

FIG. 14C shows a method for calculating spectral reflectance $Rsmp(\lambda)$ of a sample located in a cell C5 at the center in FIG. 14A. Spectral reflectance $Rsmp(\lambda)$ is given by Equation (8) below.

Equation 8

$$Rsmp(\lambda) = \left(\sum a_i R_i(\lambda)^{1/n}\right)^n \qquad (8)$$
$$= (a_{11} R_{11}(\lambda)^{1/n} + a_{12} R_{12}(\lambda)^{1/n} + a_{21} R_{21}(\lambda)^{1/n} + a_{22} R_{22}(\lambda)^{1/n}$$

$a_{11} = (1-f_c)(1-f_m)$ $a_{12} = (1-f_c)f_m$ $a_{21} = f_c(1-f_m)$ $a_{22} = f_c f_m$

Here, the ink coverage $f_c$, $f_m$ are values given by graph in FIG. 14B and defined within the cell C5. The values of spectral reflectance $R_{11}(\lambda)$, $R_{12}(\lambda)$, $R_{21}(\lambda)$, $R_{22}(\lambda)$ at the four apices of the cell C5 are adjusted according to Equation (8) so as to give correctly the spectral reflectance $Rsmp(\lambda)$. By dividing the ink color space into a plurality of cells in this way, spectral reflectance $Rsmp(\lambda)$ can be calculated more accurately as compared to the case without division. The node values of cell division are preferably set independently for each ink color.

Figure 15:
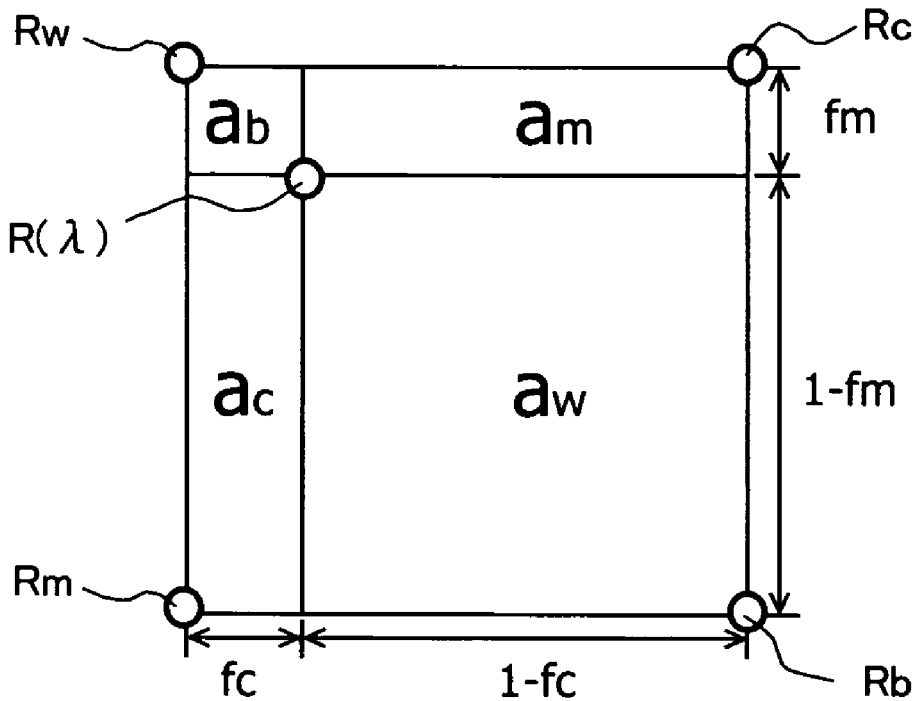
FIG. 15 illustrates a method for finding spectral reflectance, which cannot be measured, in the cellular Yule-Nielsen spectral Neugebauer model.

In the model shown in FIG. 14A, the spectral reflectance at all nodes usually cannot be derived through color match measurements. The reason is that when a large amount of ink is ejected, bleeding occurs and a color patch of uniform color is impossible to print. FIG. 15 shows a method for finding the spectral reflectance that cannot be measured. This example pertains to a case where only two inks, namely, cyan and magenta, are used. Spectral reflectance R(λ) of any color patch printed with the two inks, cyan and magenta, is given by Equation (9) below.

Equation 9

$$R(\lambda)^{1/n} = a_w R_w(\lambda)^{1/n} + a_c R_c(\lambda)^{1/n} + a_m R_m(\lambda)^{1/n} + a_b R_b(\lambda)^{1/n} \quad (9)$$

$$a_w = (1-f_c)(1-f_m)$$

$$a_c = f_c(1-f_m)$$

$$a_m = (1-f_c)f_m$$

$$a_b = f_c f_m$$

Let it be assumed that of a plurality of parameters included in Equation (9), the only unknown is spectral reflectance Rb(λ) with both the cyan ink and the magenta ink at 100% ejection amount, and values of all other parameters are known. Here, modifying Equation (9), it is possible to obtain Equation (10).

Equation 10

$$R_b(\lambda) = \left\{ \frac{R(\lambda)^{1/n} - a_w R_w(\lambda)^{1/n} - a_c R_c(\lambda)^{1/n} - a_m R_m(\lambda)^{1/n}}{a_b} \right\}^n \quad (10)$$

As mentioned hereinabove, all the terms in the right side of the equation are known. Therefore, by solving Equation (10), it is possible to calculate the unknown spectral reflectance Rb(λ).

Spectral reflectance of second order colors other than the second order colors of cyan and magenta can be found in the same manner. Furthermore, if spectral reflectance of a plurality of second order colors is found, spectral reflectance of a plurality of third order colors can be also found in a similar manner. By sequentially calculating spectral reflectance of higher order colors in this manner, it is possible to find spectral reflectance at each node of the space formed by ink area coverage and divided into cells.

The printing model computation module 25 shown in FIG. 2 is configured to have values of spectral reflectance at each node of the space formed by the ink area coverage and divided into cells as shown in FIG. 14A and a one-dimensional lookup table indicating the ink area coverage shown in FIG. 14B and to calculate the spectral reflectance Rsmp(λ) corresponding to any ink amount data by using those values and table. Furthermore, it has data indicating the color-matching function and spectral distribution of any light source, calculates tristimulus values by adding a product of those data and the spectral reflectance Rsmp(λ) to each wavelength, and acquires color values (Lab values) by converting the tristimulus values with a well-known formula.

7 Other Embodiments

The above described embodiments are merely exemplary and other configurations can be employed as long as color conversion can be implemented with high accuracy by conducting smoothing processing using data (the aforementioned learning LUT 12b2) including ink amounts selected without relaying on a special rule. Therefore, in addition to creating a LUT for converting sRGB data into ink amount data, as the color correction LUT 41, the invention may be also employed in devices conducting printing by using a profile specified by an ICC profile.

For example, in color conversion using the ICC profile, a source profile for converting the color component values (sRGB values and the like) used in an image input device such as a display into coordinate values (Lab values and the like) in a device-independent color space and a media profile for converting the coordinate values in the device-independent color space into color component values used in an image output device such as a printer are prepared in advance. Then, the colors indicated by the input image data are converted into coordinate values in the device-independent color space by referring to the source profile, and the coordinate values in the device-independent color space are converted into color component values (termed printer RGB or the like) used in the printed by referring to the media profile. The color component values are further converted into ink amount data with the above-described color no-correction LUT. As a result, printing can be executed by converting the colors of image data with high accuracy. In such an embodiment, printing can be also executed by conducting highly accurate color conversion.

In the above-described two embodiments, both the printer driver that caused the computer to function as a printing control device and the LUT creation unit that caused the computer to function as a LUT creation device could be executed in the same computer 12, but it goes without saying that the computer can be used as a separate unit. Furthermore, in the above-described printer 17, inks of six CMYKlclm colors could be carried, but it goes without saying that the number of colors may be further increased by adding DY (dark yellow) or the number of colors may be reduced by not using lclm. Furthermore, by using inks of other colors, for example R (red) and V (violet), it is possible to carry inks of six CMYKRV colors. Furthermore, in the above-described embodiment, a configuration was employed in which colorimetry was conducted with a calorimeter, but color values obviously may be acquired by using a printing model, that is, without conducting colorimetry.

Furthermore, in the above-described evaluation functions, a function may be employed such that the value thereof increases when the degree of smoothing of the grid point arrangement in the Lab color space decreases. A variety of other functions that differ from the above-described functions can be also used. For example, in the evaluation functions $E_2$, $E_3$ only the grid points for which vectors are orthogonal when the grid points form a cubic grid were extracted as grid points around the optimization object, but such a selection method is not a mandatory one. For example, an evaluation function may be obtained by including grid points such that are in opposing corner positions when the grid points form a cubic grid, as shown by vector $L_{a5}$ and vector $L_{a6}$ in FIG. 11. The grid points present in such opposing corner positions are also in the opposing corner positions in the RGB color space; in particular, an R=G=B diagonal corresponds to a gray axis. Therefore, if the smoothness degree of arrangement increases also with respect to the grid points located in the opposing corner positions, the occurrence of tone jump during monochromatic output can be prevented.

Furthermore, in the above-described embodiments, the value of evaluation functions was decreased in a grid point arrangement with a high degree of smoothness by taking a sum of vectors with mutually opposite directions, but other configurations are obviously also possible. For example, a function may be employed that evaluates whether or not relative positional relationships of grid points are analogous.

More specifically, in FIG. 11, if the difference of vector $L_{a5}$-vector $L_{a4}$ and vector $L_{a1}$-vector $L_p$ is taken, the differential vector of the two vectors, that is, (vector $L_{a5}$-vector $L_{a4}$)−(vector $L_{a1}$-vector $L_p$) can be obtained, and the relative positional relationships between the grid points can be said to be analogous when the value of the differential vector is small. Therefore, an evaluation function for evaluating the smoothness degree of arrangement can be acquired by taking the differences between the vector $L_{a1}$-vector $L_p$ and the adjacent inter-grid vectors and combining them together.

Furthermore, in the above-described evaluation functions, differences between the vectors with mutually opposite orientations centered on the grid point that is the optimization object were taken and the respective differences were added together. Thus, a state of uniform distribution of all grid points in the Lab color space was considered ideal. However, where grid points formed in the RGB color space by the RGB data specified in the initial LUT 43 nonuniform at the outset, or where it is deliberately intended to produce nonuniform grid point spacing in the Lab color space, the evaluation functions may be modified accordingly. As an example of optimum measure taken when the grid points are thus distributed uniformly, the terms corresponding to the difference between two vectors in the evaluation functions $E_1$ to $E_3$ are multiplied by different weighting factors. Furthermore, a variety of restricting conditions may be imposed to prevent each term in the evaluation functions from changing rapidly. Furthermore, the characteristic of ink amounts that have to be created may be formulated and restricting conditions may be found by the aforementioned color separation operation.

Smoothing may be also conducted by defining a virtual force acting upon a Lab grid point in the Lab color space, acquiring the position of each grid point in a stationary state attained when the virtual force acts upon each Lab grid point, acquiring an ink amount grid point corresponding to the position of the grid point in the stationary state based on the printing model, and associating the two. The virtual force can be defined to include a force that increases monotonously with the distance between a grid point of interest and the adjacent grid points that are adjacent to the grid point of interest.

For example, the force can be defined with Equation (11) below.

Equation 11

$$\vec{F}_g = k_p \sum_{n=1}^{N} (\vec{X}_{gn} - \vec{X}_g) \quad (11)$$

Here, vector X indicates the position of a grid point, g is a symbol indicating the grid point of interest, and gn is a symbol indicating the adjacent grid points. n is a number indicating the adjacent grid points, and the maximum value N of n can differ depending on the position of the grid point of interest. Furthermore, kp is a position constant. Thus, the grid point of interest and one adjacent grid point are assumed to be attracted to each other by a force directed along a straight line connecting the points, and the size of this force is defined to be proportional to the distance between the points. Where a motion equation is considered by defining a counteraction (for example, a force proportional to velocity) to this vertical force, it is possible to conduct simulation so that each grid point reaches the stationary state. Thus, smoothing can be conducted by a variety of configurations in addition to a configuration in which the degree of smoothness of grid point arrangement is evaluated by introducing evaluation functions.

Furthermore, in accordance with the invention, smoothing may be implemented by using a learning LUT obtained by selecting ink amounts by an arbitrary selection method. Therefore, in addition to the above-described method, a variety of other methods can be employed for creating the initial LUT 43. For example, in addition to calculating Lab values by associating virtual ink amounts when calculating Lab values corresponding to the orthogonal RGB grid points (step S110), Lab values can be also calculated by a well-known formula by taking RGB values of orthogonal RGB grid points as sRGB values.

Figure 16:
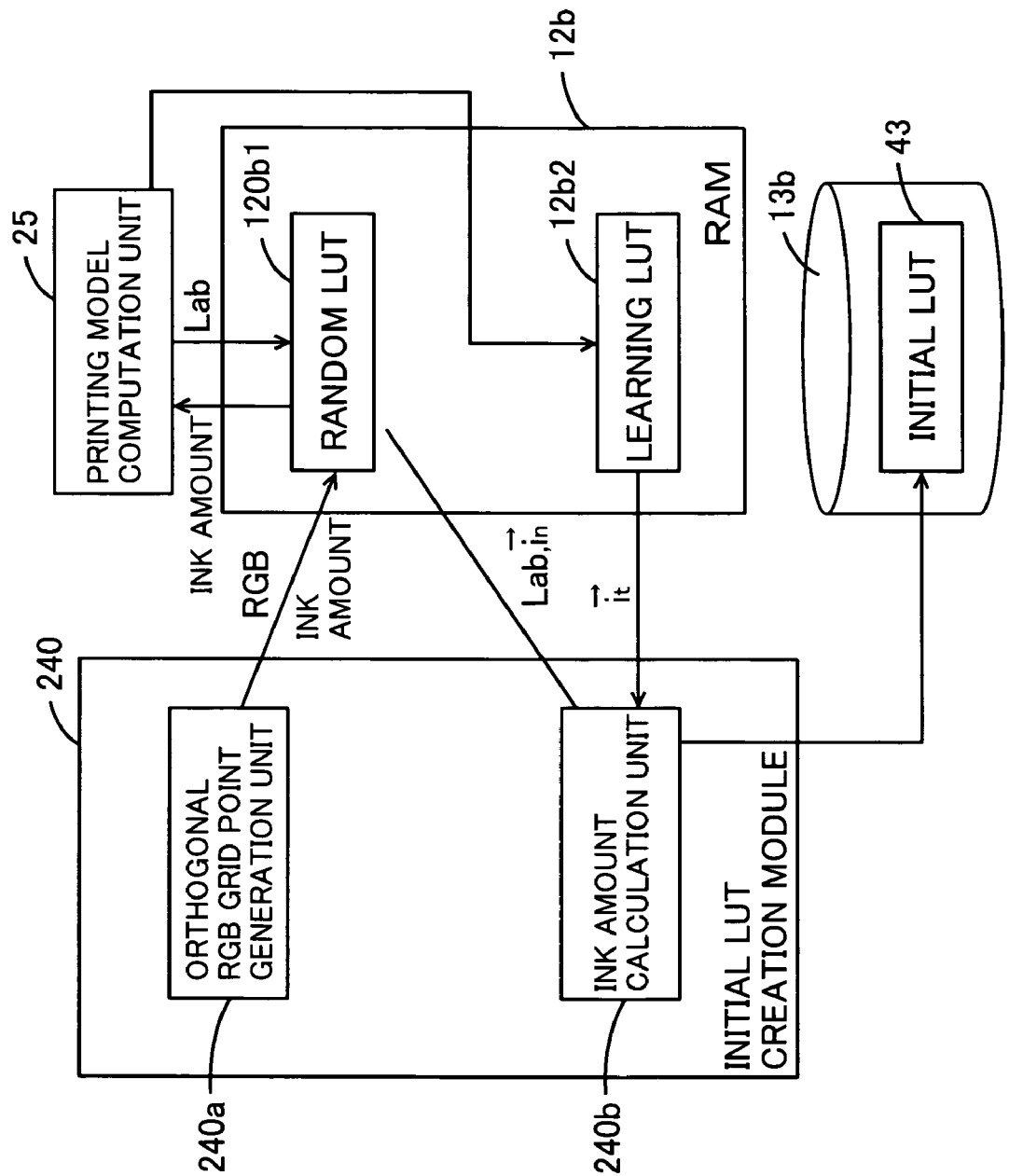
FIG. 16 is a block diagram illustrating the configuration of an initial LUT creation module.
Figure 17:
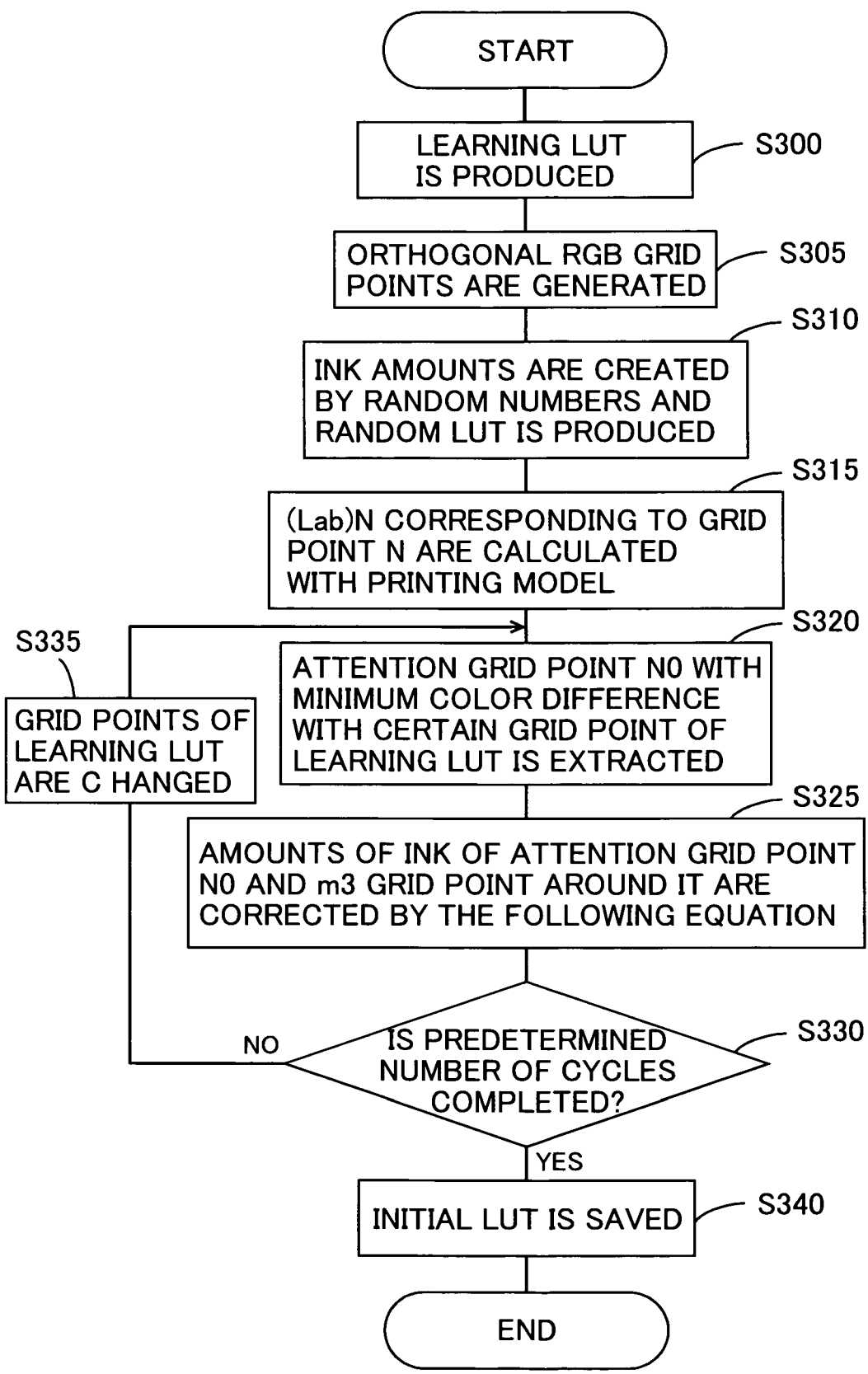
FIG. 17 is a flowchart illustrating processing executed in the initial LUT creation module.

Furthermore, the initial LUT 43 may be also created based on other methods. FIG. 16 is a block diagram illustrating the configuration of an initial LUT creation module 240 based on another method. FIG. 17 is a flowchart illustrating the processing executed in the initial LUT creation module 240. In these figures, components identical to those shown in FIG. 4 are assigned with identical symbols. The initial LUT creation module 240 comprises an orthogonal RGB grid point creation unit 240a and an ink amount calculation unit 240b. In this case, too, the printing model computation module 25 produces a learning LUT 12b2 (step S300) and produces the initial LUT 43 by using the learning LUT 12b2. The processing of producing the learning LUT 12b2 is similar to step S100 shown in FIG. 4.

The orthogonal RGB grid point creation unit 240a creates orthogonal RGB grid points by dividing uniformly the tone value region in each color component of RGB, as shown in the upper left section of FIG. 2 and combining the values obtained (step S305). In the present embodiment, a random ink amount is further determined by each color random number and associated with orthogonal RGB grid points. The obtained orthogonal RGB grid points and tone values indicating the random ink amounts are taken as a random LUT 120b1 and stored temporarily in the RAM 12b (step S310).

Once the random LUT 120b1 has been obtained, the printing model computation module 25 acquires each random ink amount grid point (grid point N) registered in the random LUT 120b1 and calculates the corresponding Lab values $((Lab)_N)$ (step S315). As a result, Lab values corresponding to respective ink amount grid points registered in the random LUT 120b1 are obtained.

Accordingly, the ink amount calculation unit 240b conducts processing for associating random ink amount grid points with the orthogonal RGB grid points by considering the adjacency relationship of orthogonal RGB grid points registered in the random LUT 120b1. For this purpose, first, the appropriate grid points are selected from the learning LUT 12b2 and an attention grid point $N_0$ with the smallest difference in color with respect to Lab values of grid points in the learning LUT 12b2 are found in the random LUT 120b1 (step S320).

More specifically, a certain appropriate grid point is selected from among grid points of the learning LUT 12b2 produced in step S300, and a grid point located in the random LUT 120b1 that indicates a Lab value with the smallest difference in color with respect to the selected grid point is extracted. The grid point extracted from the random LUT 120b1 is taken as the attention grid point $N_0$.

Then, the ink amount extraction unit 240b extracts the attention grid point $N_0$ and $m^3$ orthogonal RGB grid points located around the attention grid point and calculates the amount of ink that has to be associated with each grid point by the Equation (12) below (step S325).

Equation 12

$$\vec{i}_x = k(\vec{i}_t - \vec{i}_x) + \vec{i}_x \quad (12)$$

Here, x is a symbol for specifying a grid point; it is 0 to $(m^3-1)$. Furthermore, vector $i_x$ has random amounts of ink as components. The left side represent a value prior to updating, and the right side represents a value after updating. Thus, a vector indicating a random amount of ink associated with the attention grid point $N_0$ in the random LUT 120b1 is vector $i_0$, and random amounts of ink that are associated with orthogonal RGB grid points indicated by symbols 1 to $(m^3-1)$ and surrounding the attention grid point are vectors $i_1$ to $(m^3-1)$ Furthermore, m is a natural number determined in advance and used to determine the number of grid points around the attention grid point $N_0$. This number is decreased monotonously by one each time the loop of steps S320 to S335 is repeated a constant number of times and eventually becomes m=1. When m=1, it means that nothing except the attention grid point $N_0$ is corrected. k is a positive coefficient, 0<k<1, for adjusting the update quantity; it is determined in advance and decreased monotonously each time the loop of steps S320 to S335 is repeated.

Therefore, Equation (12) corrects the random amount of ink (vector $i_x$) by the value obtained by multiplying the difference between a random amount of ink (vector $i_x$) associated with each orthogonal RGB grid point and an amount of ink (vector it) in a grid point of the learning LUT used in step S320 by the coefficient k. Once the random amount of ink has been corrected by the above-described processing, it is determined whether or not the predetermined number of correction cycles (about 100,000-1,000,000) have been completed. If the predetermined number of correction cycles have not been completed, the grid points of the learning LUT are updated (step S335) and the processing of step S320 and subsequent steps is repeated. When the learning grid points are updated the grid points may be selected in a predetermined order or the grid point may be selected randomly.

When the predetermined number of correction cycles have been judged to have been completed in step S330, data indicating the correspondence relationship between the amount of ink obtained at this pointing time and orthogonal RGB grid points is taken as the initial LUT 43 and saved in the hard disk 13b (step S340). As described above, in the correction using Equation (12), random amounts of ink corresponding to the attention grid point and grid points located around it are corrected based on the difference with a specific amount of ink (vector it). Since this correction acts to eliminate the difference between the two, as shown in Equation (12), the random amount of ink relating each grid point approaches the specific amount of ink (vector $i_t$).

Furthermore, because the coefficient k decreases monotonously with the increase in the number of correction cycles, comparatively large correction is performed at the initial stage of the loop, but no large correction is performed at the end stage of the loop. Furthermore, learning grid points are modified with each correction and when the predetermined number of correction cycles are completed, practically all orthogonal RGB grid points, whatever is the number thereof (about several thousands to several tens of thousands) become the attention grid point and grid points located around it. As a result, the random amounts of ink associated with orthogonal RGB grid points converge gradually with the increase in the number of correction cycles. Moreover, in step S320 a grid point for which the difference in color with the learning grid point became minimum is extracted as the attention grid point. Therefore, the amounts of ink are selected progressively and consistently with the adjacency relationship of orthogonal RGB grid points.

Therefore, with the above-described processing, the initial LUT 43 in which the ink amount grid points are associated is produced to be consistent with the adjacency relationship of orthogonal RGB grid points. As described above, in accordance with the invention, smoothing may be implemented by using a learning LUT obtained by selecting ink amounts by an arbitrary selection method, and any method can be employed as long as the ink amount grid points can be selected consistently with the adjacency relationship of orthogonal RGB grid points.

Furthermore, a printing control method and printing control device by which printing is conducted by converting image data into ink amount data by referring to a color correction profile produced by associating color values of printing results at ink amounts specified in the profile produced in the above-described embodiments with color component values in a color system used in image data can be also considered to be implementation modes within the scope of the invention. Likewise, a printing control program product for executing in a computer a program code for conducting printing by converting image data into ink amount data by referring to a color correction profile produced by associating color values of printing results at ink amounts specified in the profile produced in the above-described embodiments with color component values in a color system used in image data can be also considered to be an implementation mode within the scope of the invention.

While the invention has been particularly shown and described with respect to preferred embodiments thereof, it should be understood by those skilled in the art that the foregoing and other changes in form and detail may be made therein without departing from the sprit and scope of the invention as defined in the appended claims.

What is claimed is:

1. A method for producing a profile specifying the correspondence relationship of values in different color spaces, comprising the steps of:
    acquiring a first correspondence relationship constituted by a plurality of correspondence relationships of ink amounts and color values;
    acquiring a plurality of grid points that are a plurality of grid points in a predetermined color space and for which a relative relationship between the adjacent grid points is defined;
    acquiring a second correspondence relationship constituted by a plurality of correspondence relationships of the grid points and color values;
    setting a plurality of grid points for which a relative positional relationship in a predetermined color space is defined;
    acquiring a third correspondence relationship constituted by a plurality of correspondence relationships of the grid points and ink amounts based on the first correspondence relationship and the second correspondence relationship; and
    producing with a computer a profile specifying the third correspondence relationship.

2. The method according to claim 1, wherein a grid point arrangement inside a device-independent color space of color values corresponding to the amounts of ink of the third correspondence relationship is smoothed.

3. The method according to claim 1, wherein
the plurality of ink amounts in the first correspondence relationship and the plurality of grid points in the second correspondence relationship are acquired by mutually independent methods.

4. The method according to claim 1, wherein the plurality of ink amounts in the first correspondence relationship is determined based on random numbers.

5. The method according to claim 1, wherein
the second correspondence relationship is acquired by assuming an ink amount for outputting a color close to a color indicated by the plurality of grid point and associating the color values of the color outputted by this ink amount with a plurality of the grid points;
color values associated with the respective grid points are acquired based on the second correspondence relationship;
a plurality of ink amounts associated with color values in the vicinity of the acquired color values are acquired based on the first correspondence relationship; and
the third correspondence relationship is acquired by acquiring ink amounts corresponding the plurality of grid points by multiplying each of the acquired ink amounts by an inverse number of the difference of each color value as a weighting factor and adding up the ink amounts.

6. The method according to claim 1, wherein
the second correspondence relationship is acquired by associating random amounts of ink created based on random numbers with the plurality of grid points and associating the color values corresponding to the random ink amounts with the plurality of grid points; and
the third correspondence relationship is acquired by selecting any of the plurality of grid points in the second correspondence relationship as an attention grid point, extracting an ink amount with color values closest to color values corresponding to the attention grid point from the first correspondence relationship; and
repeating a processing of correcting random ink amounts associated with the attention grid point and a plurality of grid points surrounding the attention grid point until the difference between the random ink amounts associated with the attention grid point and the plurality of grid points surrounding the attention grid point, and the extracted ink amount becomes small.

7. The method according to claim 1, wherein the color values in the first correspondence relationship are estimated by simulating a printing state of an ink in the case where printing is conducted with the corresponding ink amount.

8. A device for producing a profile specifying the correspondence relationship of values in different color spaces, comprising:
a first correspondence relationship acquisition unit for acquiring a first correspondence relationship constituted by a plurality of correspondence relationships of ink amounts and color values;
a grid point acquisition unit for setting a plurality of grid points for which a relative positional relationship in a predetermined color space is defined;
a second correspondence relationship acquisition unit for acquiring a second correspondence relationship constituted by a plurality of correspondence relationships of the grid points and color values;
a third correspondence relationship acquisition unit for acquiring a third correspondence relationship constituted by a plurality of correspondence relationships of the grid points and ink amounts based on the first correspondence relationship and the second correspondence relationship; and
a profile production unit for producing a profile specifying the third correspondence relationship.

9. A computer readable product storing a program for producing a profile specifying the correspondence relationship of values in different color spaces, this program causing a computer to execute:
a first correspondence relationship acquisition program code for acquiring a first correspondence relationship constituted by a plurality of correspondence relationships of ink amounts and color values;
a grid point acquisition program code for setting a plurality of grid points for which a relative positional relationship in a predetermined color space is defined;
a second correspondence relationship acquisition program code for acquiring a second correspondence relationship constituted by a plurality of correspondence relationships of the grid points and color values;
a third correspondence relationship acquisition program code for acquiring a third correspondence relationship constituted by a plurality of correspondence relationships of the grid points and ink amounts based on the first correspondence relationship and the second correspondence relationship; and
a profile production program code for producing a profile specifying the third correspondence relationship.

* * * * *